United States Patent
Oakes et al.

(10) Patent No.: US 11,469,407 B2
(45) Date of Patent: Oct. 11, 2022

(54) BATTERY ELECTRODE COATINGS APPLIED BY WATERBORNE ELECTRODEPOSITION

(71) Applicant: PPG Industries Ohio, Inc., Cleveland, OH (US)

(72) Inventors: Landon J. Oakes, Allison Park, PA (US); Stuart D. Hellring, Pittsburgh, PA (US); Haley L. Orler, Bridgeville, PA (US); Jacob W. Mohin, Pittsburgh, PA (US); Scott W. Sisco, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 265 days.

(21) Appl. No.: 16/228,176

(22) Filed: Dec. 20, 2018

(65) Prior Publication Data

US 2020/0203704 A1     Jun. 25, 2020

(51) Int. Cl.
  *H01M 4/04*   (2006.01)
  *C25D 9/04*   (2006.01)
  *H01M 4/131*  (2010.01)
  *H01M 4/1391* (2010.01)
  *H01M 4/02*   (2006.01)

(52) U.S. Cl.
  CPC ............ *H01M 4/0452* (2013.01); *C25D 9/04* (2013.01); *H01M 4/0404* (2013.01); *H01M 4/131* (2013.01); *H01M 4/1391* (2013.01); *H01M 2004/027* (2013.01); *H01M 2004/028* (2013.01)

(58) Field of Classification Search
  CPC ...................................................... C25D 9/04
  See application file for complete search history.

(56) References Cited

U.S. PATENT DOCUMENTS

| | | |
|---|---|---|
| 4,514,552 A | 4/1985 | Shay et al. |
| 4,786,565 A | 11/1988 | Shirai |
| 5,192,592 A | 3/1993 | Shay |
| 7,217,443 B2 | 5/2007 | Bobsein et al. |
| 9,090,727 B2 | 7/2015 | Hough et al. |
| 9,150,736 B2 | 10/2015 | Daughenbaugh et al. |
| 9,202,638 B2 | 12/2015 | Amin-Sanayei et al. |
| 9,228,041 B2 | 1/2016 | Martinez-Castro et al. |
| 9,239,051 B1 | 1/2016 | Amin-Sanayei et al. |
| 9,520,591 B2 | 12/2016 | Daughenbaugh et al. |
| 9,882,216 B2 | 1/2018 | Sasaki |
| 9,923,189 B2 | 3/2018 | Xiao |
| 10,090,527 B2 | 10/2018 | Sonobe |
| 2002/0168569 A1 | 11/2002 | Barriere et al. |
| 2013/0341194 A1 | 12/2013 | Fuchsbichler et al. |
| 2015/0280239 A1 | 10/2015 | Hellring et al. |
| 2016/0118664 A1 | 4/2016 | Sonobe |
| 2016/0204439 A1 | 7/2016 | Sonobe |
| 2016/0380255 A1 | 12/2016 | Daughenbaugh et al. |
| 2017/0352886 A1 | 12/2017 | Matsuzaki et al. |

FOREIGN PATENT DOCUMENTS

| | | |
|---|---|---|
| EP | 0226097 B1 | 5/1990 |
| EP | 1384771 A1 | 1/2004 |
| EP | 2621005 A1 | 7/2013 |
| EP | 2680349 A1 | 1/2014 |
| JP | 2011134618 A | 7/2011 |
| KR | 20130084539 A | 7/2013 |
| WO | 2013037692 | 3/2013 |
| WO | 2014065407 A1 | 9/2016 |

OTHER PUBLICATIONS

Deckner ("Carbomers: Overview, Tips, & Recommendations") accessed from https://knowledge.ulprospector.com/261/pcc-carbomers/ on Jan. 7, 2021 (Year: 2013).*

* cited by examiner

*Primary Examiner* — Peter F Godenschwager
(74) *Attorney, Agent, or Firm* — Charles M. Yeomans

(57) ABSTRACT

The present invention is directed towards an electrodepositable coating composition comprising (a) a fluoropolymer; (b) an electrochemically active material and/or electrically conductive agent; (c) a pH-dependent rheology modifier; and (d) an aqueous medium comprising water; wherein water is present in an amount of at least 45% by weight, based on the total weight of the electrodepositable coating composition. Also disclosed herein is a method of coating a substrate, as well as coated substrates and electrical storage devices.

20 Claims, No Drawings

BATTERY ELECTRODE COATINGS APPLIED BY WATERBORNE ELECTRODEPOSITION

NOTICE OF GOVERNMENT SUPPORT

This invention was made with Government support under Government Contract No. DE-EE0007266 awarded by the Department of Energy. The United States Government has certain rights in this invention.

FIELD OF THE INVENTION

The present invention is directed towards electrodepositable coating compositions and battery electrode coatings applied by waterborne electrodeposition.

BACKGROUND INFORMATION

There is a trend in the electronics industry to produce smaller devices, powered by smaller and lighter batteries. Batteries with a negative electrode—such as a carbonaceous material, and a positive electrode—such as lithium metal oxides can provide relatively high power and low weight. Binders for producing such electrodes are usually combined with the negative electrode or positive electrode in the form of a solventborne or waterborne slurry. The solventborne slurries present safety, health and environmental dangers. Many organic solvents are toxic and flammable, volatile in nature, carcinogenic and involve special manufacturing controls to mitigate risk and reduce environmental pollution, and the waterborne slurries have oftentimes produced unsatisfactory electrodes having poor adhesion and/or poor battery performance. Once applied, the bound ingredients are able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move through the electrode, and lithium ion mobility requires interconnectivity within the electrode between particles. Improved battery performance and adhesion of the coating to the electrical current collector is desired, particularly without the use of carcinogenic materials and environmental pollution.

SUMMARY OF THE INVENTION

Disclosed herein is an electrodepositable coating composition comprising (a) a fluoropolymer; (b) an electrochemically active material and/or electrically conductive agent; (c) a pH-dependent rheology modifier; and (d) an aqueous medium comprising water; wherein water is present in an amount of at least 45% by weight, based on the total weight of the electrodepositable coating composition.

Also disclosed herein is a method of coating a substrate, the method comprising electrocoating the electrodepositable coating composition of the present invention onto the substrate.

Further disclosed herein are coated substrates and electrical storage devices.

DETAILED DESCRIPTION OF THE INVENTION

As stated above, the present invention is directed to an electrodepositable coating composition comprising, consisting essentially of, or consisting of (a) a fluoropolymer; (b) an electrochemically active material; (c) a pH-dependent rheology modifier; and (d) an aqueous medium comprising water; wherein water is present in an amount of at least 45% by weight, based on the total weight of the electrodepositable coating composition.

According to the present invention, the term "electrodepositable coating composition" refers to a composition that is capable of being deposited onto an electrically conductive substrate under the influence of an applied electrical potential.

According to the present invention, the electrodepositable coating composition comprises a fluoropolymer. The fluoropolymer may comprise a portion of a binder for the electrodepositable coating composition. The fluoropolymer may be present in the electrodepositable coating composition in the form of micelles.

The fluoropolymer may comprise a (co)polymer comprising the residue of vinylidene fluoride. A non-limiting example of a (co)polymer comprising the residue of vinylidene fluoride is a polyvinylidene fluoride polymer (PVDF). As used herein, the "polyvinylidene fluoride polymer" includes homopolymers, copolymers, such as binary copolymers, and terpolymers, including high molecular weight homopolymers, copolymers, and terpolymers. Such (co)polymers include those containing at least 50 mole %, such as at least 75 mole %, and at least 80 mole %, and at least 85 mole % of the residue of vinylidene fluoride (also known as vinylidene difluoride). The vinylidene fluoride monomer may be copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride in order to produce the fluoropolymer of the present invention. The fluoropolymer may also comprise a PVDF homopolymer.

The fluoropolymer may comprise a high molecular weight PVDF having a weight average molecular weight of at least 50,000 g/mol, such as at least 100,000 g/mol, and may range from 50,000 g/mol to 1,500,000 g/mol, such as 100,000 g/mol to 1,000,000 g/mol. PVDF is commercially available, e.g., from Arkema under the trademark KYNAR, from Solvay under the trademark HYLAR, and from Inner Mongolia 3F Wanhao Fluorochemical Co., Ltd.

The fluoropolymer may comprise a (co)polymer comprising the residue of tetrafluoroethylene. The fluoropolymer may also comprise a polytetrafluoroethylene (PTFE) homopolymer.

The fluoropolymer may comprise a nanoparticle. As used herein, the term "nanoparticle" refers to particles having a particle size of less than 1,000 nm. The fluoropolymer may have a particle size of at least 50 nm, such as at least 100 nm, such as at least 250 nm, such as at least 300 nm, and may be no more than 999 nm, such as no more than 600 nm, such as no more than 450 nm, such as no more than 400 nm, such as no more than 300 nm, such as no more than 200 nm. The fluoropolymer nanoparticles may have a particle size of 50 nm to 999 nm, such as 100 nm to 800 nm, such as 100 nm to 600 nm, such as 250 nm to 450 nm, such as 300 nm to 400 nm, such as 100 nm to 400 nm, such as 100 nm to 300 nm, such as 100 nm to 200 nm. Although the fluoropolymer may comprise a nanoparticle, larger particles and combinations of nanoparticles and larger particles may also be used. As used herein, the term "particle size" refers to average diameter of the fluoropolymer particles. The particle size referred to in the present disclosure was determined by the following procedure: A sample was prepared by dispersing the fluoropolymer onto a segment of carbon tape that was attached to an aluminum scanning electron microscope (SEM) stub. Excess particles were blown off the carbon tape with compressed air. The sample was then sputter coated with Au/Pd for 20 seconds and was then analyzed in a Quanta 250 FEG SEM (field emission gun scanning electron microscope) under high vacuum. The accelerating voltage was set to 20.00 kV and the spot size was set to 3.0. Images were collected from three different areas on the prepared sample, and ImageJ software was used to measure the diameter of 10 fluoropolymer particles from each area for a total of 30 particle size measurements that were averaged together to determine the average particle size.

The fluoropolymer may be present in the binder in an amount of at least 15% by weight, such as at least 30% by weight, such as at least 40% by weight, such as at least 50% by weight, such as at least 70% by weight, such as at least 80% by weight, and may be present in an amount of no more than 99% by weight, such as no more than 96% by weight, such as no more than 95% by weight, such as no more than 90% by weight, such as no more than 80%, such as no more than 70% by weight, such as no more than 60% by weight, based on the total weight of the binder solids. The fluoropolymer may be present in in the binder in amounts of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight, based on the total weight of the binder solids.

The fluoropolymer may be present in the electrodepositable coating composition in an amount of at least 0.1% by weight, such as at least 1% by weight, such as at least 1.3% by weight, such as at least 1.9% by weight, and may be present in an amount of no more than 10% by weight, such as no more than 6% by weight, such as no more than 4.5% by weight, such as no more than 2.9% by weight, based on the total solids weight of the electrodepositable composition. The fluoropolymer may be present in the electrodepositable coating composition in an amount of 0.1% to 10% by weight, such as 1% to 6% by weight, such as 1.3% to 4.5% by weight, such as 1.9% to 2.9% by weight, based on the total solids weight of the electrodepositable coating composition.

According to the present invention, the electrodepositable coating composition optionally further comprises an electrochemically active material. The material constituting the electrochemically active material contained in the electrodepositable coating composition is not particularly limited and a suitable material can be selected according to the type of an electrical storage device of interest.

The electrochemically active material may comprise a material for use as an active material for a positive electrode. The electrochemically active material for a positive electrode may comprise a material capable of incorporating lithium (including incorporation through lithium intercalation/deintercalation), a material capable of lithium conversion, or combinations thereof. Non-limiting examples of electrochemically active materials capable of incorporating lithium include $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, and combinations thereof. Ratios of the transition metals present in the electrochemically active materials may vary. For example, $Li(NiMnCo)O_2$ (sometimes referred to as "NMC") may have ratios of Ni:Mn:Co of 1:1:1, 5:3:2, 6:2:2, and 8:1:1. Non-limiting examples of materials capable of lithium conversion include sulfur, $LiO_2$, $FeF_2$ and $FeF_3$, Si, aluminum, tin, SnCo, $Fe_3O_4$, and combinations thereof.

The electrochemically active material may comprise a material for use as an active material for a negative electrode. The electrochemically active material for a negative electrode may comprise graphite, lithium titanate (LTO), lithium vanadium phosphate (LVP), silicon, silicon compounds, tin, tin compounds, sulfur, sulfur compounds, lithium metal, graphene, or a combination thereof.

The electrochemically active material may be present in the electrodepositable coating composition in an amount of at least 45% by weight, such as at least 70% by weight, such as at least 80% by weight, such as at least 90% by weight, such as at least 91% by weight, and may be present in an amount of no more than 99% by weight, such as no more than 98% by weight, such as no more than 95% by weight, based on the total solids weight of the electrodepositable composition. The electrochemically active material may be present in the electrodepositable coating composition in an amount of 45% to 99% by weight, such as 70% to 98% by weight, such as 80% to 95% by weight, such as 90% to 95% by weight, such as 91% to 95% by weight, based on the total solids weight of the electrodepositable coating composition.

According to the present invention, the electrodepositable coating composition further comprises a pH-dependent rheology modifier. As used herein, the term "pH-dependent rheology modifier" refers to an organic compound, such as a polymer, that has a variable rheological effect based upon the pH of the composition. The pH-dependent rheology modifier may affect the viscosity of the composition on the principle of significant volume changes of the pH-dependent rheology modifier induced by changes in the pH of the composition. For example, the pH-dependent rheology modifier may be soluble at a pH range and provide certain rheological properties and may be insoluble and coalesce at a critical pH value (and above or below based upon the type of pH-dependent rheology modifier) which causes a reduction in the viscosity of the composition due to a reduction in the volume of the rheology modifier. The relationship between the pH of the composition and viscosity due to the presence of the pH-dependent rheology modifier may be non-linear. The pH-dependent rheology modifier may comprise an alkali-swellable rheology modifier or an acid swellable rheology modifier, depending upon the type of electrodeposition that the electrodepositable coating composition is to be employed. For example, alkali-swellable rheology modifiers may be used for anionic electrodeposition, whereas acid swellable rheology modifiers may be used for cathodic electrodeposition.

As used herein, the term "alkali-swellable rheology modifier" refers to a rheology modifier that increases the viscosity of a composition (i.e., thickens the composition) as the pH of the composition increases. The alkali-swellable rheology modifier may increase viscosity at a pH of about 2.5 or greater, such as about 3 or greater, such as about 3.5 or greater, such as about 4 or greater, such as about 4.5 or greater, such as about 5 or greater.

Non-limiting examples of alkali-swellable rheology modifiers include alkali-swellable emulsions (ASE), hydrophobically modified alkali-swellable emulsions (HASE), ATRP star polymers, and other materials that provide pH-triggered rheological changes at low pH, such as the pH values described herein. The alkali-swellable rheology modifiers may comprise addition polymers having constitutional units comprising the residue of ethylenically unsaturated monomers. For example, the alkali-swellable rheology modifiers may comprise addition polymers having constitutional units comprising, consisting essentially of, or consisting of the residue of: (a) 2 to 70% by weight of a monoethylenically unsaturated carboxylic acid, such as 20 to 70% by weight, such as 25 to 55% by weight, such as 35 to 55% by weight, such as 40 to 50% by weight, such as 45 to 50% by weight; (b) 20 to 80% by weight of a $C_1$ to $C_6$ alkyl (meth)acrylate, such as 35 to 65% by weight, such as 40 to 60% by weight, such as 40 to 50% by weight, such as 45 to 50% by weight; and at least one of (c) 0 to 3% by weight of a crosslinking monomer, such as 0.1 to 3% by weight, such as 0.1 to 2% by weight; and/or (d) 0 to 60% by weight of a monoethylenically unsaturated alkyl alkoxylate monomer, such as 0.5 to 60% by weight, such as 10 to 50% by weight, the % by weight being based on the total weight of the addition polymer. The ASE rheology modifiers may comprise (a) and (b) and may optionally further comprise (c), and the HASE rheology modifiers may comprise (a), (b) and (d), and may optionally further comprise (c). When (c) is present, the pH-dependent rheology modifier may be referred to as a crosslinked pH-dependent rheology modifier. When the acid groups have a high degree of protonation (i.e., are un-neutralized) at low pH, the rheology modifier is insoluble in water and does not thicken the composition, whereas when the acid is substantially deprotonated (i.e., substantially neutralized) at higher pH values, the rheology modifier becomes soluble or dispersible (such as micelles or microgels) and thickens the composition.

The (a) monoethylenically unsaturated carboxylic acid may comprise a $C_3$ to $C_8$ monoethylenically unsaturated carboxylic acid such as acrylic acid, methacrylic acid, and the like, as well as combinations thereof.

The (b) $C_1$ to $C_8$ alkyl (meth)acrylate may comprise a $C_1$ to $C_6$ alkyl (meth)acrylate, such as a $C_1$ to $C_4$ alkyl (meth)acrylate. The $C_1$ to $C_8$ alkyl (meth)acrylate may comprise a non-substituted $C_1$ to $C_8$ alkyl (meth)acrylate such as, for example, methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isopentyl (meth)acrylate, hexyl (meth)acrylate, heptyl (meth)acrylate, isoheptyl (meth)acrylate, 2-ethylhexyl (meth)acrylate, or combinations thereof.

The (c) crosslinking monomer may comprise a polyethylenically unsaturated monomer such as ethylene glycol di(meth)acrylate, 1,6-hexanediol di(meth)acrylate, divinylbenzene, trimethylolpropane diallyl ether, tetraallyl pentaerythritol, triallyl pentaerythritol, diallyl pentaerythritol, diallyl phthalate; triallyl cyanurate, bisphenol A diallyl ether, methylene bisacrylamide, allyl sucroses, and the like, as well as combinations thereof.

The (d) monoethylenically unsaturated alkylated ethoxylate monomer may comprise a monomer having a polymerizable group, a hydrophobic group and a bivalent polyether group of a poly(alkylene oxide) chain, such as a poly(ethylene oxide) chain having about 5-150 ethylene oxide units, such as 6-10 ethylene oxide units, and optionally 0-5 propylene oxide units. The hydrophobic group is typically an alkyl group having 6-22 carbon atoms (such as a dodecyl group) or an alkaryl group having 8-22 carbon atoms (such as octyl phenol). The bivalent polyether group typically links the hydrophobic group to the polymerizable group. Examples of the linking group and hydrophobic group are a bicycloheptyl-polyether group, a bicycloheptenyl-polyether group or a branched $C_5$-$C_{50}$ alkyl-polyether group, wherein the bicycloheptyl-polyether or bicycloheptenyl-polyether group may opt be substituted on one or more ring carbon atoms by one or two $C_1$-$C_6$ alkyl groups per carbon atom.

In addition to the monomers described above, the pH-dependent rheology modifier may comprise other ethylenically unsaturated monomers. Examples thereof include substituted alkyl (meth)acrylate monomers substituted with functional groups such as hydroxyl, amino, amide, glycidyl, thiol, and other functional groups; alkyl (meth)acrylate monomers containing fluorine; aromatic vinyl monomers; and the like. Alternatively, the pH-dependent rheology modifier may be substantially free, essentially free, or completely free of such monomers. As used herein, a pH-dependent rheology modifier is substantially free or essentially free of a monomer when constitutional units of that monomer are present, if at all, in an amount of less than 0.1% by weight or less than 0.01% by weight, respectively, based on the total weight of the pH-dependent rheology modifier.

The pH-dependent rheology modifier may be substantially free, essentially free, or completely free of amide, glycidyl or hydroxyl functional groups. As used herein, a pH-dependent rheology modifier is substantially free or essentially free of amide, glycidyl or hydroxyl functional groups if such groups are present, if at all, in an amount of less than 1% or less than 0.1% based on the total number of functional groups present in the pH-dependent rheology modifier.

The pH-dependent rheology modifier may comprise, consist essentially of or consist of constitutional units of the residue of methacrylic acid, ethyl acrylate and a crosslinking monomer, present in the amounts described above.

The pH-dependent rheology modifier may comprise, consist essentially of, or consist of constitutional units of the residue of methacrylic acid, ethyl acrylate and a monoethylenically unsaturated alkyl alkoxylate monomer, present in the amounts described above.

The pH-dependent rheology modifier may comprise, consist essentially of, or consist of methacrylic acid, ethyl acrylate, a crosslinking monomer and a monoethylenically unsaturated alkyl alkoxylate monomer, present in the amounts described above.

Commercially available pH-dependent rheology modifiers include alkali-swellable emulsions such as ACRYSOL ASE-60, hydrophobically modified alkali-swellable emulsions such as ACRYSOL HASE TT-615, and ACRYSOL DR-180 HASE, each of which are available from the Dow Chemical Company, and star polymers, including those produced by atom transfer radical polymerization, such as fracASSIST® prototype 2 from ATRP Solutions.

Exemplary viscosity data showing the impact of the alkali-swellable rheology modifier across a range of pH values of a composition was obtained for some non-limiting examples of alkali-swellable rheology modifiers using a Brookfield viscometer operated at 20 RPMs and using a #4 spindle. The alkali-swellable rheology modifiers ACRYSOL ASE-60, ACRYSOL HASE TT-615, and ACRYSOL DR-180 HASE were characterized at 4.25% solids in a solution of deionized water. An ATRP star polymer (fracASSIST® prototype 2) was investigated at 0.81% solids due to the limited solubility of the polymer at low pH. The pH was adjusted through the addition of dimethyl ethanolamine ("DMEA"). The viscosity measurements in centipoise (cps) across the range of pH values is provided below in Table 1.

TABLE 1

| | Rheology Modifier | | | | | | | |
|---|---|---|---|---|---|---|---|---|
| | ACRYSOL ASE-60 | | ACRYSOL HASE-TT-615 | | fracASSIST ® prototype 2 | | ACRYSOL DR-180 | |
| Property | pH | Viscosity | pH | Viscosity | pH | Viscosity | pH | Viscosity |
| | 3.53 | 0 | 4.24 | 0 | 4.04 | 0 | 4.30 | 0 |
| | 6.31 | 2,010 | 5.90 | 454 | 6.09 | 2,274 | 6.10 | 90 |
| | 6.43 | 19,280 | 6.40 | 15,600 | 7.23 | 2,352 | 6.20 | 11,160 |
| | 6.77 | 19,130 | 7.04 | Off-scale | 7.68 | 1,914 | 7.13 | Off-scale |
| | 7.42 | 17,760 | — | — | 8.72 | 1,590 | — | — |

As shown in Table 1, a composition of water and an alkali-swellable rheology modifier at 4.25% by weight of the total composition may have an increase in viscosity of at least 500 cps over an increase in pH value of 3 pH units within the pH range of 3 to 12, such as an increase of at least 1,000 cps, such as an increase of at least 2,000 cps, such as an increase of at least 3,000 cps, such as an increase of at least 5,000 cps, such as an increase of at least 7,000 cps, such as an increase of at least 8,000 cps, such as an increase of at least 9,000 cps, such as an increase of at least 10,000 cps, such as an increase of at least 12,000 cps, such as an increase of at least 14,000 cps, or more. For example, as shown for the ACRYSOL ASE-60 alkali-swellable rheology modifier in Table 1, an increase in pH from about 3.5 to about 6.5 results in an increase in the viscosity of the composition of about 19,000 cps. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity increase of at least 1,000 cps when measured from about pH 4 to about pH 7, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity increase of at least 1,000 cps when measured from about pH 4 to about pH 6.5, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a composition of water and an alkali-swellable rheology modifier of a star polymer at 0.81% by weight of the total composition may have a viscosity increase of at least 400 cps when measured from about pH 4 to about pH 6.5, such as at least 600 cps, such as at least 800 cps, such as at least 1,000 cps, such as at least 1,200 cps, such as at least 1,400 cps, such as at least 2,000 cps, such as at least 2,200 cps, as measured using a Brookfield viscometer using a #4 spindle and operated at 20 RPMs.

As used herein, the term "star polymer" refers to branched polymers with a general structure consisting of several (three or more) linear chains connected to a central core. The core of the polymer can be an atom, molecule, or macromolecule; the chains, or "arms", may include variable-length organic chains. Star-shaped polymers in which the arms are all equivalent in length and structure are considered homogeneous, and ones with variable lengths and structures are considered heterogeneous.

As used herein, the term "acid-swellable rheology modifier" refers to a rheology modifier that is insoluble at high pH and does not thicken the composition and is soluble at lower pH and thickens the composition. The acid-swellable rheology modifier may become insoluble and reduce viscosity at a pH of greater than about 6, such as greater than about 5, such as greater than about 4.5, such as greater than about 4.

The pH-dependent rheology modifier may be present in the electrodepositable coating composition in an amount of at least 1% by weight, such as at least 5% by weight, such as at least 7% by weight, such as at least 9% by weight, and may be present in an amount of no more than 50% by weight, such as no more than 40% by weight, such as no more than 35% by weight, such as no more than 30% by weight, based on the total solids weight of the binder solids. The pH-dependent rheology modifier may be present in the electrodepositable coating composition in an amount of 1% to 50% by weight, such as 5% to 40% by weight, such as 7% to 35% by weight, such as 9% to 30% by weight, based on the total solids weight of the binder solids.

The pH-dependent rheology modifier may be present in the electrodepositable coating composition in an amount of at least 0.1% by weight, such as at least 0.2% by weight, such as at least 0.3% by weight, such as at least 0.4% by weight, such as at least 1% by weight, such as at least 1.5% by weight, such as at least 2% by weight, and may be present in an amount of no more than 10% by weight, such as no more than 5% by weight, such as no more than 4% by weight, such as no more than 3% by weight, such as no more than 2% by weight, such as no more than 1% by weight, based on the total solids weight of the electrodepositable coating composition. The pH-dependent rheology modifier may be present in the electrodepositable coating composition in an amount of 0.1% to 10% by weight, such as 0.2% to 5% by weight, such as 0.3 to 4% by weight, such as 0.4% to 3% by weight, such as 0.1% to 2% by weight, such as 0.2% to 2% by weight, such as 0.3% to 2% by weight, such as 0.4% to 2% by weight, based on the total solids weight of the electrodepositable coating composition.

It has been surprisingly discovered that the use of the pH-dependent rheology modifier in the electrodepositable coating composition in the amounts herein allows for the production of electrodes by electrodeposition. Comparable electrodepositable coating compositions that do not include the pH-dependent rheology modifier were not able to produce electrodes by electrodeposition. Without intending to be bound by any theory, it is believed that the pH dependence of the rheology modifier assists in the electrodeposition of the electrodepositable coating composition because the significant difference in pH of the electrodeposition bath at the surface of the electrode to be coated relative to the rest of the electrodeposition bath causes the pH-dependent rheology modifier to undergo a significant reduction in volume at or in close proximity to the surface of the electrode to be coated inducing coalescence of the pH-dependent rheology modifier and other components of the electrodepositable coating composition on the surface of the electrode to be coated. For example, the pH at the surface of the anode in anodic electrodeposition is significantly reduced relative to the rest of the deposition bath. Likewise, the pH at the surface cathode in cathodic electrodeposition is significantly higher than the rest of the electrodeposition bath. The difference in pH at the surface of the electrode to be coated during electrodeposition relative to the electrodepositable bath in a static state may be at least 6 units, such as at least 7 units, such as at least 8 units.

The pH of the electrodepositable coating composition will depend upon the type of electrodeposition in which the composition is to be used, as well as additives, such as pigments, fillers, and the like, included in the electrodepositable coating composition. For example, an anionic electrodepositable coating composition may have a pH from about 6 to about 12, such as about 6.5 to about 11, such as about 7 to about 10.5. In contrast, a cationic electrodepositable coating composition may have a pH from about 4.5 to about 10, such as about 4.5 to about 5.5, such as about 8 to about 9.5.

According to the present invention, the electrodepositable coating composition further comprises an aqueous medium comprising water. As used herein, the term "aqueous medium" refers to a liquid medium comprising more than 50% by weight water, based on the total weight of the aqueous medium. Such aqueous mediums may comprise less than 50% by weight organic solvent, or less than 40% by weight organic solvent, or less than 30% by weight organic solvent, or less than 20% by weight organic solvent, or less than 10% by weight organic solvent, or less than 5% by weight organic solvent, or less than 1% by weight organic solvent, or less than 0.8% by weight organic solvent, or less than 0.1% by weight organic solvent, based on the total weight of the aqueous medium. Water comprises more than 50% by weight of the aqueous medium, such as at least 60% by weight, such as at least 70% by weight, such as at least 80% by weight, such as at least 85% by weight, such as at least 90% by weight, such as at least 95% by weight, such as at least 99% by weight, such as at least 99.9% by weight, such as 100% by weight, based on the total weight of the aqueous medium. Water may comprise 50.1% to 100% by weight, such as 70% to 100% by weight, such as 80% to 100% by weight, such as 85% to 100% by weight, such as 90% to 100% by weight, such as 95% to 100% by weight, such as 99% to 100% by weight, such as 99.9% to 100% by weight, based on the total weight of the aqueous medium. The aqueous medium may further comprise one or more organic solvent(s). Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. The electrodepositable coating composition may in particular be provided in the form of a dispersion, such as an aqueous dispersion.

Organic solvent may be added to waterborne formulations to modify viscosity within a desired range. The organic solvent added to the electrodepositable coating composition, or other waterborne formulation, may induce polymer swelling to achieve viscosity modification. The use of pH-dependent rheology modifiers described herein may allow for a reduction in the total amount of organic solvent required to meet desired viscosity targets to reduce the environmental impact of the compositions. Accordingly, use of the pH-dependent rheology modifier as described above in an electrodepositable coating composition may allow for production of electrodepositable coating compositions having a lower volatile organic content (VOC) than previously produced waterborne formulations. As used herein, the term "volatile organic content" or "VOC" refers to organic compounds having a boiling point of less than 250° C. As used herein, the term "boiling point" refers to the boiling point of a substance at standard atmospheric pressure of 101.325 kPa (1.01325 bar or 1 atm), also referred to as the normal boiling point. The volatile organic content includes volatile organic solvents. As used herein, the term "volatile organic solvent" refers to organic compounds having a boiling point of less than 250° C., such as less than 200° C. For example, the VOC of the electrodepositable coating composition of the present invention may be no more than 300 g/L, such as no more than 250 g/L, such as no more than 120 g/L, such as no more than 10 g/L, such as no more than 1 g/L, and may range from 0 to 300 g/L, such as 0.1 to 250 g/L, such as 110 to 250 g/L, such as 0.1 to 10 g/L. The VOC may be calculated according to the following formula:

$$VOC \ (g/L) = \frac{\text{total weight of } VOC \ (g)}{\text{volume of total composition } (L) - \text{volume of water}(L)}$$

The organic solvent may be present, if at all, in an amount of less than 10% by weight, such as less than 5% by weight, such as less than 2% by weight, such as less than 1% by weight, such as less than 0.9% by weight, such as less than 0.8% by weight, such as less than 0.7% by weight, such as less than 0.6% by weight, such as less than 0.5% by weight, based on the total weight of the electrodepositable coating composition.

Water is present in the aqueous medium such that the total amount of water present in the electrodepositable coating composition is at least 45% by weight, such as at least 50% by weight, such as at least 55% by weight, such as at least 60% by weight, such as at least 65% by weight, such as at least 70% by weight, such as at least 75% by weight, such as at least 80% by weight, such as at least 85% by weight, such as at least 90% by weight, such as at least 95% by weight, and may be present in an amount of no more than 99% by weight, such as no more than 95% by weight, such as no more than 90% by weight, such as no more than 85% by weight, such as no more than 80% by weight, such as no more than 75% by weight, based on the total weight of the electrodepositable coating composition. Water may be present in an amount of 40% to 99% by weight, such as 45% to 99% by weight, such as 50% to 99% by weight, such as 60% to 99% by weight, such as 65% to 99% by weight, such as 70% to 99% by weight, such as 75% to 99% by weight, such as 80% to 99% by weight, such as 85% to 99% by weight, such as 90% to 99% by weight, such as 40% to 90% by weight, such as 45% to 85% by weight, such as 50% to 80% by weight, such as 60% to 75% by weight, based on the total weight of the electrodepositable coating composition.

The electrodepositable coating composition may have a solids content of no more than 60% by weight, such as no more than 55% by weight, such as no more than 50% by weight, such as no more than 45% by weight, such as no more than 40% by weight, such as no more than 35% by weight, such as no more than 30% by weight, such as no more than 25% by weight, such as no more than 20% by weight, such as no more than 15% by weight, such as no more than 10% by weight, such as no more than 5% by weight, such as no more than 1% by weight, based on the total weight of the electrodepositable coating composition. The electrodepositable coating composition may have a solids content of 0.1% to 60% by weight, such as 0.1% to 55% by weight, such as 0.1% to 50% by weight, such as 0.1% to 45% by weight, such as 0.1% to 40% by weight, such as 0.1% to 35% by weight, such as 0.1% to 30% by weight, such as 0.1% to 25% by weight, such as 0.1% to 20% by weight, such as 0.1% to 15% by weight, such as 0.1% to 10% by weight, such as 0.1% to 5% by weight, such as 0.1% to 1% by weight, based on the total weight of the electrodepositable coating composition.

The electrodepositable coating composition may be packaged in the form of a concentrate that is diluted with water and optionally organic solvent prior to use as an electrodepositable coating composition. Upon dilution, the electrodepositable coating composition should have a solids and water content as described herein.

The electrodepositable coating composition of the present invention may optionally further comprise an electrically conductive agent. Non-limiting examples of electrically conductive agents include carbonaceous materials such as activated carbon, carbon black such as acetylene black and furnace black, graphite, graphene, carbon nanotubes, carbon fibers, fullerene, and combinations thereof. It should be noted graphite may be used as both an electrochemically active material for negative electrodes as well as an electrically conductive agent, but an electrically conductive material is typically omitted when graphite is used as the electrochemically active material.

The electrically conductive agent may also comprise any active carbon that has a high-surface area, such as a BET surface area of greater than 100 $m^2/g$. As used herein, the term "BET surface area" refers to a specific surface area determined by nitrogen adsorption according to the ASTM D 3663-78 standard based on the Brunauer-Emmett-Teller method described in the periodical "The Journal of the American Chemical Society", 60, 309 (1938). In some examples, the conductive carbon can have a BET surface area of 100 $m^2/g$ to 1,000 $m^2/g$, such as 150 $m^2/g$ to 600 $m^2/g$, such as 100 $m^2/g$ to 400 $m^2/g$, such as 200 $m^2/g$ to 400 $m^2/g$. In some examples, the conductive carbon can have a BET surface area of about 200 $m^2/g$. A suitable conductive carbon material is LITX 200 commercially available from Cabot Corporation.

The electrically conductive agent may be present in the electrodepositable coating composition in amounts of 0.5% to 20% by weight, such as 1% to 20% by weight, such as 2% to 10% by weight, such as 2.5% to 7% by weight, such as 3% to 5% by weight, based on the total solids weight of the electrodepositable coating composition.

The electrodepositable coating composition may optionally further comprise a dispersant. The dispersant may assist in dispersing the fluoropolymer, and/or, if present, the electrically conductive agent and/or the electrochemically active material in the liquid medium. When present, the dispersant may be a component of the electrodepositable coating composition binder. The dispersant may comprise at least one phase that is compatible with the fluoropolymer and/or other components of the electrodepositable coating composition, such as the electrically conductive agent or electrochemically active material, if present, and may further comprise at least one phase that is compatible with the aqueous medium. The electrodepositable coating composition may comprise one, two, three, four or more different dispersants, and each dispersant may assist in dispersing a different component of the electrodepositable coating composition. The dispersant may comprise any material having phases compatible with both the fluoropolymer and/or, if present, the electrically conductive agent or electrochemically active material, and the aqueous medium. As used herein, the term "compatible" means the ability of a material to form a blend with other materials that is and will remain substantially homogenous over time, i.e. does not show sedimentation or phase separation over time. For example, the dispersant may comprise a polymer comprising such phases. The fluoropolymer and dispersant may not be bound by a covalent bond. The dispersant may be present in the electrodepositable coating composition in the form of a micelle. The dispersant may be in the form of a block polymer, a random polymer, or a gradient polymer, wherein the different phases of the dispersant are present in the different blocks of the polymer, are randomly included throughout the polymer, or are progressively more or less densely present along the polymer backbone, respectively. The dispersant may comprise any suitable polymer to serve this purpose. For example, the polymer may comprise addition polymers produced by polymerizing ethylenically unsaturated monomers, polyepoxide polymers, polyamide polymers, polyurethane polymers, polyurea polymers, polyether polymers, polyacid polymers, polyester polymers, and copolymers thereof, among others. The dispersant may also serve as an additional component of the binder of the electrodepositable coating composition.

The dispersant may comprise functional groups. The functional groups may comprise, for example, active hydrogen functional groups, heterocyclic groups, and combinations thereof. As used herein, the term "active hydrogen functional groups" refers to those groups that are reactive with isocyanates as determined by the Zerewitinoff test described in the JOURNAL OF THE AMERICAN CHEMICAL SOCIETY, Vol. 49, page 3181 (1927), and include, for example, hydroxyl groups, primary or secondary amino groups, carboxylic acid groups, and thiol groups. As used herein, the term "heterocyclic group" refers to a cyclic group containing at least two different elements in its ring such as a cyclic moiety having at least one atom in addition to carbon in the ring structure, such as, for example, oxygen, nitrogen or sulfur. Non-limiting examples of heterocylic groups include epoxides, lactams and lactones. In addition, when epoxide functional groups are present on the addition polymer, the epoxide functional groups on the dispersant may be post-reacted with a beta-hydroxy functional acid. Non-limiting examples of beta-hydroxy functional acids include citric acid, tartaric acid, and/or an aromatic acid, such as 3-hydroxy-2-naphthoic acid. The ring opening reaction of the epoxide functional group will yield hydroxyl functional groups on the dispersant.

When acid functional groups are present, the dispersant may have a theoretical acid equivalent weight of at least 350 g/acid equivalent, such as at least 878 g/acid equivalent, such as at least 1,757 g/acid equivalent, and may be no more than 17,570 g/acid equivalent, such as no more than 12,000 g/acid equivalent, such as no more than 7,000 g/acid equivalent. The dispersant may have a theoretical acid equivalent weight of 350 to 17,570 g/acid equivalent, such as 878 to 12,000 g/acid equivalent, such as 1,757 to 7,000 g/acid equivalent.

As mentioned above, the dispersant may comprise an addition polymer. The addition polymer may be derived from, and comprise constitutional units comprising the residue of one or more alpha, beta-ethylenically unsaturated monomers, such as those discussed below, and may be prepared by polymerizing a reaction mixture of such monomers. The mixture of monomers may comprise one or more active hydrogen group-containing ethylenically unsaturated monomers. The reaction mixture may also comprise ethylenically unsaturated monomers comprising a heterocyclic group. As used herein, an ethylenically unsaturated monomer comprising a heterocyclic group refers to a monomer having at least one alpha, beta ethylenic unsaturated group and at least cyclic moiety having at least one atom in addition to carbon in the ring structure, such as, for example, oxygen, nitrogen or sulfur. Non-limiting examples of ethylenically unsaturated monomers comprising a heterocyclic group include epoxy functional ethylenically unsaturated monomers, vinyl pyrrolidone and vinyl caprolactam, among others. The reaction mixture may additionally comprise other ethylenically unsaturated monomers such as alkyl esters of (meth)acrylic acid and others described below.

The addition polymer may comprise a (meth)acrylic polymer that comprises constitutional units comprising the residue of one or more (meth)acrylic monomers. The (meth)acrylic polymer may be prepared by polymerizing a reaction mixture of alpha, beta-ethylenically unsaturated monomers that comprise one or more (meth)acrylic monomers and optionally other ethylenically unsaturated monomers. As used herein, the term "(meth)acrylic monomer" refers to acrylic acid, methacrylic acid, and monomers derived therefrom, including alkyl esters of acrylic acid and methacrylic acid, and the like. As used herein, the term "(meth)acrylic polymer" refers to a polymer derived from or comprising constitutional units comprising the residue of one or more (meth)acrylic monomers. The mixture of monomers may comprise one or more active hydrogen group-containing (meth)acrylic monomers, ethylenically unsaturated monomers comprising a heterocyclic group, and other ethylenically unsaturated monomers. The (meth)acrylic polymer may also be prepared with an epoxy functional ethylenically unsaturated monomer such as glycidyl methacrylate in the reaction mixture, and epoxy functional groups on the resulting polymer may be post-reacted with a beta-hydroxy functional acid such as citric acid, tartaric acid, and/or 3-hydroxy-2-naphthoic acid to yield hydroxyl functional groups on the (meth)acrylic polymer.

The addition polymer may comprise constitutional units comprising the residue of an alpha, beta-ethylenically unsaturated carboxylic acid. Non-limiting examples of alpha, beta-ethylenically unsaturated carboxylic acids include those containing up to 10 carbon atoms such as acrylic acid and methacrylic acid. Non-limiting examples of other unsaturated acids are alpha, beta-ethylenically unsaturated dicarboxylic acids such as maleic acid or its anhydride, fumaric acid and itaconic acid. Also, the half esters of these dicarboxylic acids may be employed. The constitutional units comprising the residue of the alpha, beta-ethylenically unsaturated carboxylic acids may comprise at least 1% by weight, such as at least 2% by weight, such as at least 5% by weight, and may be no more than 50% by weight, such as no more than 20% by weight, such as no more than 10% by weight, such as no more than 5% by weight, based on the total weight of the addition polymer. The constitutional units comprising the residue of the alpha, beta-ethylenically unsaturated carboxylic acids may comprise 1% to 50% by weight, 2% to 50% by weight, such as 2% to 20% by weight, such as 2% to 10% by weight, such as 2% to 5% by weight, such as 1% to 5% by weight, based on the total weight of the addition polymer. The addition polymer may be derived from a reaction mixture comprising the alpha, beta-ethylenically unsaturated carboxylic acids in an amount of 1% to 50% by weight, 2% to 50% by weight, such as 2% to 20% by weight, such as 2% to 10% by weight, such as 2% to 5% by weight, such as 1% to 5% by weight, based on the total weight of polymerizable monomers used in the reaction mixture. The inclusion of constitutional units comprising the residue of alpha, beta-ethylenically unsaturated carboxylic acids in the dispersant results in a dispersant comprising at least one carboxylic acid group which may assist in providing stability to the dispersion.

The addition polymer may comprise constitutional units comprising the residue of an alkyl esters of (meth)acrylic acid containing from 1 to 3 carbon atoms in the alkyl group. Non-limiting examples of alkyl esters of (meth)acrylic acid containing from 1 to 3 carbon atoms in the alkyl group include methyl (meth)acrylate and ethyl (meth)acrylate. The constitutional units comprising the residue of the alkyl esters of (meth)acrylic acid containing from 1 to 3 carbon atoms in the alkyl group may comprise at least 20% by weight, such as at least 30% by weight, such as at least 40% by weight, such as at least 45% by weight, such as at least 50% by weight, and may be no more than 98% by weight, such as no more than 96% by weight, such as no more than 90% by weight, such as no more than 80% by weight, such as no more than 75% by weight, based on the total weight of the addition polymer. The constitutional units comprising the residue of the alkyl esters of (meth)acrylic acid containing from 1 to 3 carbon atoms in the alkyl group may comprise 20% to 98% by weight, such as 30% to 96% by weight, such as 30% to 90% by weight, 40% to 90% by weight, such as 40% to 80% by weight, such as 45% to 75% by weight, based on the total weight of the addition polymer. The addition polymer may be derived from a reaction mixture comprising the alkyl esters of (meth)acrylic acid containing from 1 to 3 carbon atoms in the alkyl group in an amount of 20% to 98% by weight, such as 30% to 96% by weight, such as 30% to 90% by weight, 40% to 90% by weight, such as 40% to 80% by weight, such as 45% to 75% by weight, based on the total weight of polymerizable monomers used in the reaction mixture.

The addition polymer may comprise constitutional units comprising the residue of an alkyl esters of (meth)acrylic acid containing from 4 to 18 carbon atoms in the alkyl group. Non-limiting examples of alkyl esters of (meth)acrylic acid containing from 4 to 18 carbon atoms in the alkyl group include butyl (meth)acrylate, hexyl (meth)acrylate, octyl (meth)acrylate, isodecyl (meth)acrylate, stearyl (meth)acrylate, 2-ethylhexyl (meth)acrylate, decyl (meth)acrylate and dodecyl (meth)acrylate. The constitutional units comprising the residue of the alkyl esters of (meth)acrylic acid containing from 4 to 18 carbon atoms in the alkyl group may comprise at least 2% by weight, such as at least 5% by weight, such as at least 10% by weight, such as at least 15% by weight, such as at least 20% by weight, and may be no more than 70% by weight, such as no more than 60% by weight, such as no more than 50% by weight, such as no more than 40% by weight, such as no more than 35% by weight, based on the total weight of the addition polymer. The constitutional units comprising the residue of the alkyl esters of (meth)acrylic acid containing from 4 to 18 carbon atoms in the alkyl group may comprise 2% to 70% by weight, such as 2% to 60% by weight, such as 5% to 50% by weight, 10% to 40% by weight, such as 15% to 35% by weight, based on the total weight of the addition polymer. The addition polymer may be derived from a reaction mixture comprising the alkyl esters of (meth)acrylic acid containing from 4 to 18 carbon atoms in the alkyl group in an amount of 2% to 70% by weight, such as 2% to 60% by weight, such as 5% to 50% by weight, 10% to 40% by weight, such as 15% to 35% by weight, based on the total weight of polymerizable monomers used in the reaction mixture.

The addition polymer may comprise constitutional units comprising the residue of a hydroxyalkyl ester. Non-limiting examples of hydroxyalkyl esters include hydroxyethyl (meth)acrylate and hydroxypropyl (meth)acrylate. The constitutional units comprising the residue of the hydroxyalkyl ester may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the hydroxyalkyl ester may comprise 0.5% to 30% by weight, such as 1% to 20% by weight, such as 2% to 20% by weight, such as 2% to 10% by weight, such as 2% to 5% by weight, based on the total weight of the addition polymer. The addition polymer may be derived from a reaction mixture comprising the hydroxyalkyl ester in an amount of 0.5% to 30% by weight, such as 1% to 20% by weight, such as 2% to 20% by weight, such as 2% to 10% by weight, such as 2% to 5% by weight, based on the total weight of polymerizable monomers used in the reaction mixture. The inclusion of constitutional units comprising the residue of a hydroxyalkyl ester in the dispersant results in a dispersant comprising at least one hydroxyl group (although hydroxyl groups may be included by other methods). Hydroxyl groups resulting from inclusion of the hydroxyalkyl esters (or incorporated by other means) may react with a separately added crosslinking agent that comprises functional groups reactive with hydroxyl groups such as, for example, an aminoplast, phenolplast, polyepoxides, carbodiimide and blocked polyisocyanates, or with N-alkoxymethyl amide groups or blocked isocyanato groups present in the addition polymer when self-crosslinking monomers that have groups that are reactive with the hydroxyl groups are incorporated into the addition polymer.

The addition polymer may comprise constitutional units comprising the residue of an ethylenically unsaturated monomer comprising a heterocyclic group. Non-limiting examples of ethylenically unsaturated monomers comprising a heterocyclic group include epoxy functional ethylenically unsaturated monomers, such as glycidyl (meth)acrylate, vinyl pyrrolidone and vinyl caprolactam, among others. The constitutional units comprising the residue of the ethylenically unsaturated monomers comprising a heterocyclic group may comprise at least 0.5% by weight, such as at least 1% by weight, such as at least 5% by weight, such as at least 8% by weight, and may be no more than 99% by weight, such as no more than 50% by weight, such as no more than 40% by weight, such as no more than 30% by weight, such as no more than 27% by weight, based on the total weight of the addition polymer. The constitutional units comprising the residue of the ethylenically unsaturated monomers comprising a heterocyclic group may comprise 0.5% to 99% by weight, such as 0.5% to 50% by weight, such as 1% to 40% by weight, such as 5% to 30% by weight, such as 8% to 27% by weight, based on the total weight of the addition polymer. The addition polymer may be derived from a reaction mixture comprising the ethylenically unsaturated monomers comprising a heterocyclic group in an amount of 0.5% to 50% by weight, such as 1% to 40% by weight, such as 5% to 30% by weight, such as 8% to 27% by weight, based on the total weight of polymerizable monomers used in the reaction mixture.

As noted above, the addition polymer may comprise constitutional units comprising the residue of a self-crosslinking monomer, and the addition polymer may comprise a self-crosslinking addition polymer. As used herein, the term "self-crosslinking monomer" refers to monomers that incorporate functional groups that may react with other functional groups present on the dispersant to a crosslink between the dispersant or more than one dispersant. Non-limiting examples of self-crosslinking monomers include N-alkoxymethyl (meth)acrylamide monomers such as N-butoxymethyl (meth)acrylamide and N-isopropoxymethyl (meth)acrylamide, as well as self-crosslinking monomers containing blocked isocyanate groups, such as isocyanatoethyl (meth)acrylate in which the isocyanato group is reacted ("blocked") with a compound that unblocks at curing temperature. Examples of suitable blocking agents include epsilon-caprolactam and methylethyl ketoxime. The constitutional units comprising the residue of the self-crosslinking monomer may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the self-crosslinking monomer may comprise 0.5% to 30% by weight, such as 1% to 20% by weight, such as 2% to 20% by weight, such as 2% to 10% by weight, such as 2% to 5% by weight, based on the total weight of the addition polymer. The addition polymer may be derived from a reaction mixture comprising the self-crosslinking monomer in an amount of 0.5% to 30% by weight, such as 1% to 20% by weight, such as 2% to 20% by weight, such as 2% to 10% by weight, such as 2% to 5% by weight, based on the total weight of polymerizable monomers used in the reaction mixture.

The addition polymer may comprise constitutional units comprising the residue of other alpha, beta-ethylenically unsaturated monomers. Non-limiting examples of other alpha, beta-ethylenically unsaturated monomers include vinyl aromatic compounds such as styrene, alpha-methyl styrene, alpha-chlorostyrene and vinyl toluene; organic nitriles such as acrylonitrile and methacrylonitrile; allyl monomers such as allyl chloride and allyl cyanide; monomeric dienes such as 1,3-butadiene and 2-methyl-1,3-butadiene; and acetoacetoxyalkyl (meth)acrylates such as acetoacetoxyethyl methacrylate (AAEM) (which may be self-crosslinking). The constitutional units comprising the residue of the other alpha, beta-ethylenically unsaturated monomers may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the other alpha, beta-ethylenically unsaturated monomers may comprise 0.5% to 30% by weight, such as 1% to 20% by weight, such as 2% to 20% by weight, such as 2% to 10% by weight, such as 2% to 5% by weight, based on the total weight of the addition polymer. The addition polymer may be derived from a reaction mixture comprising the other alpha, beta-ethylenically unsaturated monomers in an amount of 0.5% to 30% by weight, such as 1% to 20% by weight, such as 2% to 20% by weight, such as 2% to 10% by weight, such as 2% to 5% by weight, based on the total weight of polymerizable monomers used in the reaction mixture.

The monomers and relative amounts may be selected such that the resulting addition polymer has a Tg of 100° C. or less, typically from −50° C. to +70° C., such as −50° C. to 0° C. A lower Tg that is below 0° C. may be desirable to ensure acceptable battery performance at low temperature.

The addition polymers may be prepared by conventional free radical initiated solution polymerization techniques in which the polymerizable monomers are dissolved in a solvent or a mixture of solvents and polymerized in the presence of a free radical initiator until conversion is complete. The solvent used to produce the addition polymer may comprise any suitable organic solvent or mixture of solvents.

Examples of free radical initiators are those which are soluble in the mixture of monomers such as azobisisobutyronitrile, azobis(alpha, gamma-methylvaleronitrile), tertiary-butyl perbenzoate, tertiary-butyl peracetate, benzoyl peroxide, ditertiary-butyl peroxide and tertiary amyl peroxy 2-ethylhexyl carbonate.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications.

To prepare the addition polymer, the solvent may be first heated to reflux and the mixture of polymerizable monomers containing the free radical initiator may be added slowly to the refluxing solvent. The reaction mixture is then held at polymerizing temperatures so as to reduce the free monomer content, such as to below 1.0 percent and usually below 0.5 percent, based on the total weight of the mixture of polymerizable monomers.

For use in the electrodepositable coating composition of the invention, the dispersants prepared as described above usually have a weight average molecular weight of about 5,000 to 500,000 g/mol, such as 10,000 to 100,000 g/mol, and 25,000 to 50,000 g/mol.

The dispersant may be present in the electrodepositable coating composition in amount of 0% to 35% by weight, such as 2% to 35% by weight, such as 5% to 32% by weight, such as 8% to 30% by weight, such as 15% to 27% by weight, based on the total weight of the binder solids.

The electrodepositable coating composition may optionally further comprise a separately added crosslinking agent for reaction with, for example, the dispersant. The crosslinking agent should be soluble or dispersible in the aqueous medium and be reactive with active hydrogen groups of the dispersant, such as carboxylic acid groups and/or hydroxyl groups, if present. Non-limiting examples of suitable crosslinking agents include aminoplast resins, blocked polyisocyanates, carbodiimide, and polyepoxides.

Examples of aminoplast resins for use as a crossslinking agent are those which are formed by reacting a triazine such as melamine or benzoguanamine with formaldehyde. These reaction products contain reactive N-methylol groups. Usually, these reactive groups are etherified with methanol, ethanol, butanol including mixtures thereof to moderate their reactivity. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Blocked polyisocyanate crosslinking agents are typically diisocyanates such as toluene diisocyanate, 1,6-hexamethylene diisocyanate and isophorone diisocyanate including isocyanato dimers and trimers thereof in which the isocyanate groups are reacted ("blocked") with a material such as epsilon-caprolactam and methylethyl ketoxime. At curing temperatures, the blocking agents unblock exposing isocyanate functionality that is reactive with the hydroxyl functionality associated with the (meth)acrylic polymer. Blocked polyisocyanate crosslinking agents are commercially available from Covestro as DESMODUR BL.

Carbodiimide crosslinking agents may be in monomeric or polymeric form, or a mixture thereof. Carbodiimide crosslinking agents refer to compounds having the following structure:

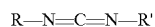

R—N═C═N—R' wherein R and R' may each individually comprise an aliphatic, aromatic, alkylaromatic, carboxylic, or heterocyclic group. Examples of commercially available carbodiimide crosslinking agents include, for example, those sold under the trade name CARBODILITE available from Nisshinbo Chemical Inc., such as CARBODILITE V-02-L2, CARBODILITE SV-02, CARBODILITE E-02, CARBODILITE SW-12G, CARBODILITE V-10 and CARBODILITE E-05.

Examples of polyepoxide crosslinking agents are epoxy-containing (meth)acrylic polymers such as those prepared from glycidyl methacrylate copolymerized with other vinyl monomers, polyglycidyl ethers of polyhydric phenols such as the diglycidyl ether of bisphenol A; and cycloaliphatic polyepoxides such as 3,4-epoxycyclohexylmethyl-3,4-epoxycyclohexane carboxylate and bis(3,4-epoxy-6-methylcyclohexyl-methyl) adipate.

In addition to promoting the cross-linking of the dispersant, the crosslinking agents, including those associated with crosslinking monomers as well as separately added crosslinking agents, react with the hydrophilic groups, such as active hydrogen functional groups of the dispersant preventing these groups from absorbing moisture that could be problematic in a lithium ion battery.

The separately added crosslinker may be present in the electrodepositable coating composition in amounts of 0% to 15% by weight, such as 1% to 15% by weight, the % by weight being based on the total weight of the binder solids.

As used herein, the term "binder solids" may be used synonymously with "resin solids" and includes the fluoropolymer, the pH-dependent rheology modifier, and, if present, the dispersant, the adhesion promoter, and the separately added crosslinking agent. As used herein, the term "binder dispersion" refers to a dispersion of the binder solids in the aqueous medium.

The fluoropolymer to pH-dependent rheology modifier weight ratio may be at least 1:20, such as at least 1:2, such as at least 1:1, such as at least 3:1, such as at least 4:1, such as at least 6:1, such as at least 10:1, such as at least 15:1, such as at least 19:1, and may be no more than 20:1, such as no more than 15:1, such as no more than 10:1, such as no more than 6:1, such as no more than 4:1, such as no more than 3:1, such as no more than 1:1, such as no more than 1:2, such as no more than 1:3. The fluoropolymer to pH-dependent rheology modifier weight ratio may be from 1:20 to 20:1, such as 1:2 to 15:1, such as 1:1 to 10:1, such as 3:1 to 6:1.

The binder may comprise, consist essentially of, or consist of the fluoropolymer in amounts of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; the pH-dependent rheology modifier in an amount of 1% to 50% by weight, such as 5% to 40% by weight, such as 7% to 35% by weight, such as 9% to 30% by weight; the dispersant, if present, in amounts of 0% to 35% by weight, such as 2% to 35% by weight, such as 5% to 32% by weight, such as 8% to 30% by weight, such as 15% to 27% by weight; and the separately added crosslinker, if present, in amounts of 0 to 15% by weight, such as 1% to 15% by weight, the % by weight being based on the total weight of the binder solids.

The binder solids may be present in the electrodepositable coating composition in amounts of 1% to 20% by weight, such as 1% to 10% by weight, such as 2% to 8% percent by weight, such as 3% to 5% by weight, based on the total solids weight of the electrodepositable coating composition.

The total solids of the electrodepositable coating composition may be at least 0.1% by weight, such as at least 1% by weight, such as at least 3% by weight, such as at least 5% by weight, such as at least 7% by weight, such as at least 10% by weight, such as at least 20% by weight, such as at least 30% by weight, such as at least 40% by weight, and may be no more than 60% by weight, such as no more than 50% by weight, such as no more than 40% by weight, such as no more than 30% by weight, such as no more than 25% by weight, such as no more than 20% by weight, such as no more than 15% by weight, such as no more than 12% by weight, such as no more than 10% by weight, such as no more than 7% by weight, such as no more than 5% by weight, based on the total weight of the electrodepositable coating composition. The total solids of the electrodepositable coating composition may be 0.1% to 60% by weight, such as 0.1% to 50% by weight, such as 0.1% to 40% by weight, such as 0.1% to 30% by weight, such as 0.1% to 25% by weight, such as 0.1% to 20% by weight, such as 0.1% to 15% by weight, such as 0.1% to 12% by weight, such as 0.1% to 10% by weight, such as 0.1% to 7% by weight, such as 0.1% to 5% by weight, such as 1% to 60% by weight, such as 1% to 50% by weight, such as 1% to 40% by weight, such as 1% to 30% by weight, such as 1% to 25% by weight, such as 1% to 20% by weight, such as 1% to 15% by weight, such as 1% to 12% by weight, such as 1% to 10% by weight, such as 1% to 7% by weight, such as 1% to 5% by weight based on the total weight of the electrodepositable coating composition.

The electrodepositable coating composition may comprise, consist essentially of, or consist of the fluoropolymer in an amount of 0.1% to 10% by weight, such as 1% to 6% by weight, such as 1.3% to 4.5% by weight, such as 1.9% to 2.9% by weight; the pH-dependent rheology modifier in an amount of 0.1% to 10% by weight, such as 0.2% to 5% by weight, such as 0.3 to 4% by weight, such as 0.4% to 3% by weight, such as 0.1% to 2% by weight, such as 0.2% to 2% by weight, such as 0.3% to 2% by weight, such as 0.4% to 2% by weight; the electrochemically active material in an amount of 45% to 99% by weight, such as 70% to 98% by weight, such as 80% to 95% by weight, such as 90% to 95% by weight, such as 91% to 95% by weight; the electrically conductive agent in an amount of 0.5% to 20% by weight, such as 1% to 20% by weight, such as 3% to 10% by weight, such as 5% to 7% by weight; and optionally the dispersant; the separately added crosslinking agent; and organic solvent in an amount of less than 10% by weight, such as less than 5% by weight, such as less than 2% by weight, such as less than 1% by weight, such as less than 0.9% by weight, such as less than 0.8% by weight, such as less than 0.7% by weight, such as less than 0.6% by weight, such as less than 0.5% by weight, based on the total solids weight of the electrodepositable coating composition, and water in an amount of 40% to 99% by weight, such as 45% to 99% by weight, such as 50% to 99% by weight, such as 60% to 99% by weight, such as 65% to 99% by weight, such as 70% to 99% by weight, such as 75% to 99% by weight, such as 80% to 99% by weight, such as 85% to 99% by weight, such as 90% to 99% by weight, such as 40% to 90% by weight, such as 45% to 85% by weight, such as 50% to 80% by weight, such as 60% to 75% by weight; based on the total weight of the electrodepositable coating composition.

The electrodepositable coating composition may optionally further comprise an adhesion promoter. The adhesion promoter may comprise an acid-functional polyolefin or a thermoplastic material.

The acid-functional polyolefin adhesion promoter may comprise an ethylene-(meth)acrylic acid copolymer, such as an ethylene-acrylic acid copolymer or an ethylene-methacrylic acid copolymer. The ethylene-acrylic acid copolymer may comprise constitutional units comprising 10% to 50% by weight acrylic acid, such as 15% to 30% by weight, such as 17% to 25% by weight, such as about 20% by weight, based on the total weight of the ethylene-acrylic acid copolymer, and 50% to 90% by weight ethylene, such as 70% to 85% by weight, such as 75% to 83% by weight, such as about 80% by weight, based on the total weight of the ethylene-acrylic acid copolymer. A commercially available example of such a copolymer includes PRIMACOR 5980i, available from the Dow Chemical Company.

The adhesion promoter may be present in the electrodepositable coating composition in an amount of 1% to 60% by weight, such as 10% to 40% by weight, such as 25% to 35% by weight, based on the total weight of the binder solids (including the adhesion promoter).

The electrodepositable coating composition may optionally further comprise a pH adjustment agent. The pH adjustment agent may comprise an acid or base. The acid may comprise, for example, phosphoric acid or carbonic acid. The base may comprise, for example, lithium hydroxide, lithium carbonate, or dimethylethanolamine (DMEA). Any suitable amount of pH adjustment agent needed to adjust the pH of the electrodepositable coating composition to the desired pH range may be used.

The present invention is also directed to an electrodepositable coating composition comprising, consisting essentially of, or consisting of (a) a fluoropolymer; (b) an electrically conductive agent; (c) a pH-dependent rheology modifier; and (d) an aqueous medium comprising water; wherein water is present in an amount of at least 45% by weight, based on the total weight of the electrodepositable coating composition.

The fluoropolymer, the pH-dependent rheology and the aqueous medium may be the same materials and present in the same amounts as described above.

The electrically conductive agent may be the same as those described above. The electrically conductive agent may be present in the electrodepositable coating composition in an amount of at least 45% by weight, such as at least 70% by weight, such as at least 80% by weight, such as at least 90% by weight, such as at least 91% by weight, and may be present in an amount of no more than 99% by weight, such as no more than 98% by weight, such as no more than 95% by weight, based on the total solids weight of the electrodepositable composition. The electrically conductive agent may be present in the electrodepositable coating composition in an amount of 45% to 99% by weight, such as 70% to 98% by weight, such as 80% to 95% by weight, such as 90% to 95% by weight, such as 91% to 95% by weight, based on the total solids weight of the electrodepositable coating composition.

The electrodepositable coating composition comprising, consisting essentially of, or consisting of (a) a fluoropolymer; (b) an electrically conductive agent; (c) a pH-dependent rheology modifier; and (d) an aqueous medium comprising water may further comprise the optional ingredients described above, including the dispersant, separately added crosslinking agent, adhesion promoter and pH adjustment agent, in the amounts as described above.

The present invention is also directed to methods for coating a substrate. The electrodepositable coating composition may be electrodeposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 1XXX, 2XXX, 3XXX, 4XXX, 5XXX, 6XXX, 7XXX or 8XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. The substrate may be in the form of a current collector comprising a conductive material, and the conductive material may comprise a metal such as iron, copper, aluminum, nickel, and alloys thereof, as well as stainless steel. Other suitable conductive substrates include conductive carbon; a material coated with a conductive primer; a pre-made battery electrode for preparation of a multi-layered battery electrode; an electrically conductive porous polymer; and a porous polymer comprising a conductive composite. The substrate may also comprise an electrically insulating porous polymer wherein the substrate is coated using a conductive backing, such as, for example, by the method and with the apparatus disclosed in U.S. Publication No. 2016/0317974 at paragraphs [0054] to [0058].

The method for coating a substrate may comprise electrodepositing an electrodepositable coating composition as described above to at least a portion of the substrate and at least partially curing the coating composition to form an at least partially cured coating on the substrate. According to the present invention, the method may comprise (a) electrodepositing onto at least a portion of the substrate an electrodepositable coating composition of the present invention and (b) heating the coated substrate to a temperature and for a time sufficient to cure the electrodeposited coating on the substrate.

In the methods of the present invention, a coating is applied onto or over at least a portion of the substrate via an electrodeposition process. In such a process, an electrically conductive substrate (such as any of those described earlier) serving as an electrode (such as an anode in anionic electrodeposition) in an electrical circuit comprising the electrode and a counter-electrode (such as a cathode in anionic electrodeposition) is immersed in the electrodepositable coating composition of the present invention. An electric current is passed between the electrodes to cause the coating to deposit on the substrate. The applied voltage may be varied and can be, for example, as low as one volt to as high as several thousand volts, but is often between 50 and 500 volts. The current density is often between 0.5 ampere and 15 amperes per square foot. The residence time of the substrate in the composition may be from 10 to 180 seconds.

After electrocoating, drying and/or crosslinking, the coating film, if applicable, may be done, for example, by heating at elevated temperature, such as at least 50° C., such as at least 60° C., such as 50-400° C., such as 100-300° C., such as 150-280° C., such as 200-275° C., such as 225-270° C., such as 235-265° C., such as 240-260° C. The time of heating will depend somewhat on the temperature. Generally, higher temperatures require less time for drying/curing. Typically, drying/curing times are for at least 5 minutes, such as 5 to 60 minutes. The temperature and time should be sufficient such that the film is dried and the dispersant in the cured film is crosslinked (if applicable), that is, covalent bonds are formed between co-reactive groups on the dispersant polymer chain, such as carboxylic acid groups and hydroxyl groups and the N-methylol and/or the N-methylol ether groups of an aminoplast, isocyanato groups of a blocked polyisocyanate crosslinking agent, or in the case of a self-curing dispersant, the N-alkoxymethyl amide groups or blocked isocyanato groups. The crosslinked dispersant may be substantially solvent resistant to the solvents of the electrolyte mentioned below. Other methods of drying the coating film include ambient temperature drying, microwave drying and infrared drying, and other methods of curing the coating film include e-beam curing and UV curing.

The present invention is also directed to an electrode comprising an electrical current collector and a film formed on the electrical current collector, wherein the film is electrodeposited from the electrodepositable coating composition described above. The electrode may be a positive electrode or a negative electrode and may be manufactured by electrodepositing the above-described electrodepositable coating composition to the surface of the current collector to form a coating film, and subsequently drying and/or curing the coating film.

The coating film of the electrode may comprise a cross-linked coating. As used herein, the term "cross-linked coating" refers to a coating that includes either (1) a dispersant comprising self-crosslinking groups wherein the self-crosslinking groups have reacted to form covalent bonds that cross-link the component molecules, or (2) a dispersant having functional groups and a separately added crosslinking agent having functional groups reactive with the functional groups of the dispersant wherein the functional groups of the dispersant react with the functional groups of the crosslinking agent to form covalent bonds that may cross-link the component molecules. The pH-dependent rheology modifier and adhesion promoter, if present, may also have functional groups reactive with functional groups of the dispersant or separately added crosslinking agent and may also serve to cross-link the coating.

The current collector may comprise a conductive material, and the conductive material may comprise a metal such as iron, copper, aluminum, nickel, and alloys thereof, as well as stainless steel. For example, the current collector may comprise aluminum or copper in the form of a mesh, sheet or foil. Although the shape and thickness of the current collector are not particularly limited, the current collector may have a thickness of about 0.001 to 0.5 mm, such as a mesh, sheet or foil having a thickness of about 0.001 to 0.5 mm.

In addition, the current collector may be pretreated with a pretreatment composition prior to depositing the electrodepositable coating composition of the present invention. As used herein, the term "pretreatment composition" refers to a composition that upon contact with the current collector, reacts with and chemically alters the current collector surface and binds to it to form a protective layer. The pretreatment composition may be a pretreatment composition comprising a group IIIB and/or IVB metal. As used herein, the term "group IIIB and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metals themselves may be used, however, a group IIIB and/or IVB metal compound may also be used. As used herein, the term "group IIIB and/or IVB metal compound" refers to compounds that include at least one element that is in group IIIB or group IVB of the CAS Periodic Table of the Elements. Suitable pretreatment compositions and methods for pretreating the current collector are described in U.S. Pat. No. 9,273,399 at col. 4, line 60 to col. 10, line 26, the cited portion of which is incorporated herein by reference. The pretreatment composition may be used to treat current collectors used to produce positive electrodes or negative electrodes.

To prepare an electrode for a lithium ion electrical storage device, an electrodepositable coating composition comprising the electrochemically active material, an electrically conductive agent, a fluoropolymer, a pH-dependent rheology modifier, and optional ingredients, is prepared by combining the ingredients to form the electrodepositable coating composition. These substances can be mixed together by agitation with a known means such as a stirrer, bead mill or high-pressure homogenizer. Exemplary methods for preparing such composition are presented in the examples below.

The thickness of the coating formed after electrodeposition may be at least 1 micron, such as 1 to 1,000 microns (μm), such as 10 to 500 μm, such as 50 to 250 μm, such as 75 to 200 μm.

According to the present invention, electrodes produced by electrodeposition using the electrodepositable coating composition of the present invention may have improved adhesion over comparable aqueous coating compositions applied by other methods, such as, for example, casting. For example, the 90° peel strength adhesion of the coating to the substrate may be measured using a Mark-10 (model DC4060) motorized test stand equipped with a mechanically driven 90° peel stage. A 12.7 mm strip of the coated substrate may be cut and anchored to the stage using adhesive tape. Peel strength may be gauged as the force required to delaminate the coating film from the substrate. Lateral movement of the peel stage may be actively driven at the same rate as the vertical movement of the peel head to ensure a 90° peel and provide an accurate and reproducible measure of peel strength. This test method may be referred to herein as PEEL STRENGTH TEST METHOD. The 90° peel strength adhesion may be at least 20% greater than a comparative coating composition, such as at least 40%, such as at least 50%, such as at least 75%, such as at least 100%, such as at150%, such as at least 200%, such as at least 250%, such as at least 300%, such as at least 350%, such as at least 375%, such as at least 400%, such as at least 430%, as measured according to PEEL STRENGTH TEST METHOD. As used herein, the term "comparative coating composition" may refer to either aqueous compositions that do not include the pH-dependent rheology modifier and otherwise have similar amounts of components as the electrodepositable coating compositions of the present invention, or aqueous compositions having relatively similar compositions that are applied by a method other than electrodeposition.

The 90° peel strength adhesion may be at least 5 N/m, such as at least 8 N/m, such as at least 10 N/m, such as at least 12 N/m, such as at least 15 N/m, such as at least 17 N/m, such as at least 19 N/m, as measured according to PEEL STRENGTH TEST METHOD.

The present invention is also directed to an electrical storage device. An electrical storage device according to the present invention may be manufactured by using one or more of the above electrodes prepared from the electrodepositable coating composition of the present invention. The electrical storage device comprises an electrode, a counter-electrode and an electrolyte. The electrode, counter-electrode or both may comprise the electrode of the present invention, as long as one electrode is a positive electrode and one electrode is a negative electrode. Electrical storage devices according to the present invention include a cell, a battery, a battery pack, a secondary battery, a capacitor, and a supercapacitor.

The electrical storage device includes an electrolytic solution and can be manufactured by using parts such as a separator in accordance with a commonly used method. As a more specific manufacturing method, a negative electrode and a positive electrode are assembled together with a separator therebetween, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electrical storage devices in accordance with the types of a negative electrode active material and a positive electrode active material. The electrolytic solution may be a solution containing an electrolyte dissolved in a suitable solvent. The electrolyte may be conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, LiBr, LiB($C_2H_5$)$_4$, LiB($C_6H_5$)$_4$, LiSO$_3$CF$_3$, LiSO$_3$CH$_3$, LiC$_4$F$_9$SO$_3$, Li(CF$_3$SO$_2$)$_2$N, and LiB$_4$CH$_3$SO$_3$Li. The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as γ-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide. The concentration of the electrolyte in the electrolytic solution may be 0.5 to 3.0 mole/L, such as 0.7 to 2.0 mole/L.

During discharge of a lithium ion electrical storage device, lithium ions may be released from the negative electrode and carry the current to the positive electrode. This process may include the process known as deintercalation. During charging, the lithium ions migrate from the electrochemically active material in the positive electrode to the negative electrode where they become embedded in the electrochemically active material present in the negative electrode. This process may include the process known as intercalation.

The electrodepositable coating composition may be substantially free, essentially free, or completely free of N-methyl-2-pyrrolidone (NMP). The electrodepositable coating composition may also be substantially free, essentially free, or completely free of further fugitive adhesion promoter. As used herein, the term "fugitive adhesion promoter" refers to N-methyl-2-pyrrolidone (NMP), dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea. As used herein, an electrodepositable coating composition substantially free of fugitive adhesion promoter includes less than 1% by weight fugitive adhesion promoter, if any at all, based on the total weight of the electrodepositable coating composition. As used herein, an electrodepositable coating composition essentially free of fugitive adhesion promoter includes less than 0.1% by weight fugitive adhesion promoter, if any at all, based on the total weight of the electrodepositable coating composition. When present, the fugitive adhesion promoter may be present in an amount of less than 2% by weight, such as less 1% by weight, such as less than 0.9% by weight, such as less than 0.1% by weight, such as less than 0.01% by weight, such as less than 0.001% by weight, based on the total weight of the electrodepositable coating composition.

The electrodepositable coating composition may be substantially free, essentially free, or completely free of organic carbonate. As used herein, an electrodepositable composition is substantially free or essentially free of organic carbonate when organic carbonate is present, if at all, in an amount less than 1% by weight or less than 0.1% by weight, respectively, based on the total weight of the electrodepositable coating composition.

The electrodepositable coating composition may be substantially free, essentially free, or completely free of acrylic-modified fluoropolymer. As used herein, an electrodepositable composition is substantially free or essentially free of acrylic-modified fluoropolymer when acrylic-modified fluoropolymer is present, if at all, in an amount less than 1% by weight or less than 0.1% by weight, respectively, based on the total weight of the electrodepositable coating composition.

The electrodepositable coating composition may be substantially free of acrylonitrile. As used herein, an electrodepositable composition is substantially free or essentially free of acrylonitrile when acrylonitrile is present, if at all, in an amount less than 1% by weight or less than 0.1% by weight, respectively, based on the total weight of the electrodepositable coating composition.

The electrodepositable coating composition may be substantially free of graphene oxide. As used herein, an electrodepositable composition is substantially free or essentially free of graphene oxide when graphene oxide is present, if at all, in an amount less than 5% by weight or less than 1% by weight, respectively, based on the total weight of the electrodepositable coating composition.

The electrodepositable coating may be substantially free, essentially free, or completely free of isophorone.

According to the present invention, the electrodepositable coating composition may be substantially free, essentially free or completely free of polyethylene, polytetrafluoroethylene, tetrafluoroethylene-hexafluoropropylene copolymer, and/or polyacrylonitrile derivatives.

The electrodepositable coating may be substantially free, essentially free, or completely free of a cellulose derivative. Non-limiting examples of cellulose derivatives includes carboxymethylcellulose and salts thereof (CMC). CMC is a cellulosic ether in which a portion of the hydroxyl groups on the anhydroglucose rings are substituted with carboxymethyl groups.

The pH-dependent rheology modifier may be substantially free, essentially free, or completely free of the residue of a carboxylic acid amide monomer unit. As used herein, a pH-dependent rheology modifier is substantially free or essentially free of carboxylic acid amide monomer units when carboxylic acid amide monomer units are present, if at all, in an amount less than 0.1% by weight or less than 0.01% by weight, respectively, based on the total weight of the pH-dependent rheology modifier.

The electrodepositable coating may be substantially free, essentially free, or completely free of multi-functional hydrazide compounds. As used herein, an electrodepositable composition is substantially free or essentially free of multi-functional hydrazide compounds when multi-functional hydrazide compounds are present, if at all, in an amount less than 0.1% by weight or less than 0.01% by weight, respectively, based on the total binder solids weight of the electrodepositable coating composition.

The electrodepositable coating may be substantially free, essentially free, or completely free of styrene-butadiene rubber (SBR), acrylonitrile butadiene rubber or acrylic rubber. As used herein, an electrodepositable composition is substantially free or essentially free of styrene-butadiene rubber (SBR), acrylonitrile butadiene rubber or acrylic rubber when styrene-butadiene rubber (SBR), acrylonitrile butadiene rubber or acrylic rubber is present, if at all, in an amount less than 5% by weight or less than 1% by weight, respectively, based on the total binder solids weight of the electrodepositable coating composition.

The electrodepositable coating may be substantially free, essentially free, or completely free of poly(meth)acrylic acid having more than 70% by weight (meth)acrylic acid functional monomers, based on the total weight of the poly(meth)acrylic acid. As used herein, an electrodepositable composition is substantially free or essentially free of poly(meth)acrylic acid when poly(meth)acrylic acid is present, if at all, in an amount less than 5% by weight or less than 1% by weight, respectively, based on the total binder solids weight of the electrodepositable coating composition.

The electrodepositable coating composition may be substantially free, essentially free, or completely free of particulate polymers containing the residue of an aliphatic conjugated diene monomer unit and an aromatic vinyl monomer unit. As used herein, an electrodepositable composition is substantially free or essentially free of such particular polymers when the particular polymer is present, if at all, in an amount less than 5% by weight or less than 1% by weight, respectively, based on the total weight of the binder solids.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, 2-ethylacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" is a theoretical value being the glass transition temperature as calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook $3^{rd}$ edition, John Wiley, New York, 1989.

As used herein, unless otherwise defined, the term "substantially free" means that the component is present, if at all, in an amount of less than 5% by weight, based on the total weight of the electrodepositable coating composition.

As used herein, unless otherwise defined, the term "essentially free" means that the component is present, if at all, in an amount of less than 1% by weight, based on the total weight of the electrodepositable coating composition.

As used herein, unless otherwise defined, the term "completely free" means that the component is not present in the electrodepositable coating composition, i.e., 0.00% by weight, based on the total weight of the electrodepositable coating composition.

As used herein, the term "total solids" refers to the non-volatile components of the electrodepositable coating composition of the present invention and specifically excludes the aqueous medium. The total solids include at least the fluoropolymer, electrochemically active material, pH-dependent rheology modifier, and the dispersant, electrically conductive agent, adhesion promoter, and separately added crosslinking agent, if present.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" fluoropolymer, "an" electrochemically active material, and "a" modifier with pH-dependent rheology, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

In view of the foregoing, the present invention thus relates inter alia, without being limited thereto, to the following aspects:

1. An electrodepositable coating composition comprising:
   (a) a fluoropolymer;
   (b) an electrochemically active material and/or an electrically conductive agent;
   (c) a pH-dependent rheology modifier; and
   (d) an aqueous medium comprising water;
   wherein water is present in an amount of at least 45% by weight, based on the total weight of the electrodepositable coating composition.
2. The electrodepositable composition of Aspect 1, wherein the fluoropolymer comprises a (co)polymer comprising the residue of vinylidene fluoride.
3. The electrodepositable coating composition of Aspect 1 or Aspect 2, wherein the fluoropolymer comprises a (co)polymer comprising the residue of tetrafluoroethylene.
4. The electrodepositable coating composition of any one of Aspects 1-3, wherein the electrochemically active material comprises $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, or a combination thereof.
5. The electrodepositable coating composition of any one of Aspects 1-3, wherein the electrochemically active material comprises sulfur, $LiO_2$, $FeF_2$ and $FeF_3$, Si, aluminum, tin, SnCo, $Fe_3O_4$, or combinations thereof.
6. The electrodepositable coating composition of any one of Aspects 1-3, wherein the electrochemically active material comprises graphite, lithium titanate, lithium vanadium phosphate, silicon, silicon compounds, tin, tin compounds, sulfur, sulfur compounds, lithium metal, graphene, or a combination thereof.
7. The electrodepositable coating composition of any one of Aspects 1-6, wherein the pH-dependent rheology modifier comprises an alkali-swellable rheology modifier.
8. The electrodepositable coating composition of Aspect 7, wherein a composition of water and the alkali-swellable rheology modifier at 4.25% by weight of the total composition may have an increase in viscosity of at least 500 cps over an increase in pH value of 1 pH unit, as measured using a Brookfield viscometer using a #4 spindle and operated at 20 RPMs.
9. The electrodepositable coating composition of any one of Aspects 1-6, wherein the pH-dependent rheology modifier comprises an acid-swellable rheology modifier.
10. The electrodepositable coating composition of any one of Aspects 1-9 further comprising a dispersant.
11. The electrodepositable coating composition of Aspect 10, wherein the dispersant comprises a (meth)acrylic polymer dispersant.
12. The electrodepositable coating composition of Aspect 10 or Aspect 11, further comprising a crosslinking agent.
13. The electrodepositable coating composition of any one of Aspects 1-12, wherein the crosslinking agent comprises an aminoplast resin, a blocked polyisocyanate, a carbodiimide, a polyepoxide or combinations thereof.
14. The electrodepositable coating composition of any one of Aspects 1-13, wherein the electrically conductive agent comprises conductive carbon black, carbon nanotubes, graphene, graphite, carbon fibers, fullerenes, and combinations thereof.
15. The electrodepositable coating composition of any of Aspects 1-14, wherein the electrodepositable coating composition comprises:
   (a) 0.1% to 10% by weight of the fluoropolymer;
   (b) 45% to 99% by weight of the electrochemically active material;
   (c) 0.1% to 10% by weight of the pH-dependent rheology modifier; and
   (d) optionally 0.5% to 20% by weight of the electrically conductive agent; the % by weight based on the total solids weight of the electrodepositable composition.
16. The electrodepositable coating composition of any one of Aspects 1-15, wherein the VOC of the electrodepositable coating composition is no more than 300 g/L.
17. The electrodepositable coating composition of any one of Aspects 1-16, wherein the electrodepositable coating composition is substantially free of fugitive adhesion promoter.
18. The electrodepositable coating composition of any one of Aspects 1-17, wherein a coating produced by electrodepositing the electrodepositable coating composition of any one of Aspects 1-17 to a substrate has a 90° peel strength at least 20% greater than a comparative coating composition that does not include the pH-dependent rheology modifier, the 90° peel strength measured according to PEEL STRENGTH TEST METHOD.
19. The electrodepositable coating composition of any one of Aspects 1-18, wherein a coating produced by electrodepositing the electrodepositable coating composition of any one of Aspects 1-18 to a substrate has a 90° peel strength of at least 5 N/m, as measured according to PEEL STRENGTH TEST METHOD.
20. A method of coating a substrate, the method comprising: electrocoating the electrodepositable coating composition of any one of Aspects 1-19 onto a substrate.
21. The method of Aspect 20, wherein the method has a mass deposition rate of the electrodepositable coating composition of at least 0.5 mg/cm$^2$/s.
22. A coated substrate comprising an electrical current collector and a coating formed on the at least a portion of the electrical current collector, wherein the coating is electrodeposited from the electrodepositable coating composition of any one of Aspects 1-19, preferably in a method according to any of Aspects 20 or 21.
23. The coated substrate of Aspect 22, wherein the electrical current collector comprises aluminum, copper, steel, stainless steel, nickel, conductive carbon, a conductive primer coating, or a porous polymer.
24. The coated substrate of Aspect 22 or Aspect 23, wherein the coated substrate comprises a positive electrode.
25. The coated substrate of Aspect 22 or Aspect 23, wherein the coated substrate comprises a negative electrode.
26. An electrodepositable coating composition comprising:
   (a) a fluoropolymer;
   (b) an electrically conductive agent;
   (c) a pH-dependent rheology modifier; and
   (d) an aqueous medium comprising water;
   wherein water is present in an amount of at least 45% by weight, based on the total weight of the electrodepositable coating composition.
27. An electrical storage device comprising:
   (a) an electrode comprising the coated substrate of any one of Aspects 22-25;
   (b) a counter-electrode, and
   (c) an electrolyte.
28. The electrical storage device of Aspect 27, wherein the electrical storage device comprises a cell.
29. The electrical storage device of Aspect 27, wherein the electrical storage device comprises a battery pack.
30. The electrical storage device of Aspect 27, wherein the electrical storage device comprises a secondary battery.
31. The electrical storage device of Aspect 27, wherein the electrical storage device comprises a capacitor.
32. The electrical storage device of Aspect 27, wherein the electrical storage device comprises a supercapacitor.

33. Use of a pH-dependent rheology modifier in a process of electrophodepositing an electrodepositable coating composition to produce a coated substrate.

34. The use of Aspect 33, wherein the electrodepositable coating composition is an electrodepositable coating composition as described in any one of Aspects 1-19 and/or the electrodepositable coating composition is deposited in a method as described in any one of Aspects 20-21 and/or the coated substrate is a coated substrate as described in any one of Aspects 22-25 and/or the coated substrate is comprised in an electrical storage device as described in any of Aspects 27-32.

Illustrating the invention are the following examples, which, however, are not to be considered as limiting the invention to their details. Unless otherwise indicated, all parts and percentages in the following examples, as well as throughout the specification, are by weight.

EXAMPLES

Example 1: Preparation of Dispersant 427.2 grams of diacetone alcohol was added to a four-neck round bottom flask equipped with a mechanical stir blade, thermocouple, and reflux condenser. The diacetone alcohol was heated to a set point of 122° C. under a nitrogen atmosphere. A monomer solution containing 317.3 grams of methyl methacrylate ("MMA"), 479 grams of butyl acrylate ("BA"), 104.4 grams of ethyl acrylate ("EA"), and 122.8 grams of methacrylic acid ("MAA") was thoroughly mixed in a separate container. An initiator solution of 9.95 grams of tert-amyl peroctoate and 179 grams of diacetone alcohol was also prepared in a separate container. The initiator and monomer solutions were co-fed into the flask at the same time using addition funnels over 210 and 180 minutes, respectively. After the initiator and monomer feeds were complete, the monomer addition funnel was rinsed with 51.1 grams of diacetone alcohol and the resulting solution was held at 122° C. for 1 hour. Then a second initiator solution of 3.1 grams of tert-amyl peroctoate and 53.7 grams of diacetone alcohol was added over 30 minutes. After this second initiator feed was complete, the initiator addition funnel was rinsed with 25 grams of diacetone alcohol. The solution was then held at 120° C. for 90 minutes. After the 90-minute hold, the solution was cooled to 100° C. and then 139.9 grams of dimethyl ethanolamine was added over 10 minutes. After the addition, the solution was held at 100° C. for 15 minutes and then cooled to 70° C. Once the solution reached 70° C., 2,593.4 grams of warm (70° C.) deionized water was added over 60 minutes and was mixed for 15 minutes to form a dispersion. After mixing, the resin dispersion was poured into a suitable container. The total solids of the resin dispersion were measured to be 23.5% solids. The solids content was determined by adding a quantity of the resin dispersion to a tared aluminum dish, recording the weight of the dispersant and dish, heating the test specimen in the dish for 60 minutes at 110° C. in an oven, allowing the dish to cool, reweighing the dish to determine the amount of non-volatile content remaining, determining the solids content for each sample by dividing the weight of the non-volatile content by the total sample weight and multiplying by 100. This measurement was completed twice and the final number is an average of the two measured values.

Example 2: Preparation of Dispersion of PVDF and Dispersant 92.3 grams of deionized water, 134.4 grams (31.52 grams of solid material) of dispersant prepared using the method of Example 1 and 0.23 grams of a de-foaming agent (Drewplus™) were combined in a plastic cup. The resultant mixture was stirred vigorously using a Cowles blade while maintaining a modest vortex at 1200 RPMs. The mixing was continued while 73.5 grams of polyvinylidene difluoride powder (RZ-49 available from Asambly Chemical) was added in small portions of about 0.5 grams over 5 minutes. Mixing was continued for an additional 45 minutes after all the polyvinylidene difluoride powder was added.

Example 3: Preparation of Dispersion of PVDF without Dispersant 286.0 grams of deionized water, 98.4 grams of ACRYSOL™ ASE-60 (3.33 grams of solid material) and 0.16 grams of a de-foaming agent (Drewplus™) were combined in a plastic cup. The resultant mixture was stirred vigorously using a Cowles blade while maintaining a modest vortex at 1200 RPMs. This mixing was continued while 64.3 grams of polyvinylidene difluoride powder, RZ-49 (available from Asambly Chemical) was added in small portions of about 0.5 grams over 5 minutes. Mixing was continued for an additional 45 minutes at a constant speed of 1200 RPMs after all the polyvinylidene difluoride powder was added. During the mixing, pH was adjusted to a value of 6.68 using dimethylethanolamine (DMEA) to facilitate the dispersion of the PVDF powder.

Preparation of Electrodepositable Coating Compositions for Producing Positive Electrodes and Evaluation Thereof Examples 4-9: Preparation of Electrodepositable Coating Compositions and Positive Electrodes Produced by Electrodeposition Thereof

TABLE 2

| | | Example # and Amount of Ingredient | | | | | |
|---|---|---|---|---|---|---|---|
| Charge # | Ingredient | 4 | 5 | 6 | 7 | 8 | 9 |
| 1 | ACRYSOL ASE-60[1] | 2.67 g (0.11 g solids, 0.4% by weight of total solids) | 8.01 g (0.33 g solids, 1.2% by weight of total solids) | 13.35 g (0.54 g solids, 2% by weight of total solids) | — | — | — |

TABLE 2-continued

| Charge # | Ingredient | 4 | 5 | 6 | 7 | 8 | 9 |
|---|---|---|---|---|---|---|---|
| | ACRYSOL HASE TT-615[2] | — | — | — | 2.56 g (0.11 g solids, 0.4% by weight of total solids) | — | — |
| | ATRP Star Polymer[3] | — | — | — | — | 13.15 g (0.11 g solids, 0.4% by weight of total solids) | — |
| | ACRYSOL HASE-DR180[4] | — | — | — | — | — | 2.56 g (0.11 g solids, 0.4% by weight of total solids) |
| 2 | Dispersion of PVDF and Dispersant of Example 2 | 2.8 g (0.98 g solids, 3.6% by weight of total solids) | 2.18 g (0.76 g solids, 2.8% by weight of total solids) | 1.55 g (0.54 g solids, 2% by weight of total solids) | 2.8 g (0.98 g solids, 3.6% by weight of total solids) | 2.8 g (0.98 g solids, 3.6% by weight of total solids) | 2.8 g (0.98 g solids, 3.6% by weight of total solids) |
| 3 | Ethanol | 1.702 g | 1.702 g | 1.73 g | 1.73 g | 1.73 g | 1.73 g |
| 4 | DI Water | 22.05 g | 17.28 g | 12.56 g | 22.45 g | 12.23 g | 22.45 g |
| 5 | Electrochem. Active Material | 25 g (92% by weight of total solids) | 25 g (92% by weight of total solids) | 25 g (92% by weight of total solids) | 25 g (92% by weight of total solids) | 25 g (92% by weight of total solids) | 25 g (92% by weight of total solids) |
| 6 | Electrically Conductive Agent | 1.09 g (4% by weight of total solids) | 1.09 g (4% by weight of total solids) | 1.09 g (4% by weight of total solids) | 1.09 g (4% by weight of total solids) | 1.09 g (4% by weight of total solids) | 1.09 g (4% by weight of total solids) |
| 7 | Organic Solvent | 2.257 g | 2.257 g | 2.257 g | 2.301 g | 2.301 g | 2.301 g |
| 8 | Organic Solvent | 0.705 g | 0.705 g | 0.705 g | 0.719 g | 0.719 g | 0.719 g |
| 9 | DI Water | 214 g | 213 g | 212 g | 213 g | 203 g | 213 g |

[1] Commercially available from Dow Chemical Co.
[2] Commercially available from Dow Chemical Co.
[3] fracAS SIST® prototype 2 commercially available from ATRP Solutions.
[4] Commercially available from Dow Chemical Co.

Electrodepositable coating compositions were produced by combining the ingredients identified in Table 2 as follows: To a plastic cup was added a dispersion of an alkali swellable rheology modifier (Charge 1), a dispersion of PVDF and dispersant (Charge 2), ethanol (Charge 3), and deionized water (Charge 4). This mixture was mixed in a centrifugal mixer at 2,000 RPMs for 5 minutes. Next, electrochemically active material for a positive electrode ("NMC", $LiNi_{0.3}Co_{0.3}Mn_{0.3}O_2$ commercially available from MTI) was added to the mixture (Charge 5), and the mixture was mixed in a centrifugal mixer at 2000 RPMs for 5 minutes. Next, an electrically conductive agent ("Super P" carbon black commercially available from Imerys) was added to the mixture (Charge 6), and the mixture was mixed in a centrifugal mixer at 2000 RPMs for 5 minutes. Finally, organic co-solvents Hexyl CELLOSOLVE™ glycol ether from DOW Chemical Co. (Charge 7) and DOWANOL™ PnB glycol ether from DOW Chemical Co. (Charge 8) were added to the mixture, and the mixture was mixed in a centrifugal mixer at 2000 RPMs for 5 minutes. The composition was diluted to 10% total solids by addition of deionized water under constant stirring using a magnetic stir bar at 800 RPMs (Charge 9). The pH of each fully formulated electrodepositable coating composition is reported in Table 3. After 30 minutes of stirring, anionic electrodeposition was performed for each composition. A 4 cm by 6 cm carbon-coated aluminum foil immersed 3 cm into the electrodepositable coating composition served as the anode to be coated with a separation of 2.7 cm from a 4 cm by 6 cm aluminum foil as a counter electrode immersed 3 cm into the electrodepositable coating composition serving as the cathode. The electrodepositable coating composition was stirred using a magnetic stirrer throughout the duration of the electrodeposition, and a 100V electrical potential was applied across the electrodes using a direct current rectifier for three different time durations for each composition. After deposition, the films were rinsed with deionized water, left to dry overnight and then weighed to determine the amount of material that was deposited during electrodeposition. Depositions at durations of 10 s, 20 s, and 30 s were measured to determine a mass deposition rate of each electrodepositable coating composition as calculated by a linear fit to the measured deposited mass at each time and including the point (0,0). The mass deposition rate for each composition is included in Table 3.

TABLE 3

|  | Ex. 4 | Ex. 5 | Ex. 6 | Ex. 7 | Ex. 8 | Ex. 9 |
|---|---|---|---|---|---|---|
| pH | 8.11 | 8.8 | 8.9 | 8.92 | 8.77 | 9.13 |
| Mass Deposition Rate (mg/cm$^2$/s) | 1.02 | 0.97 | 0.97 | 1.02 | 0.73 | 0.93 |

Example 10: Preparation of Electrodepositable Coating Composition and Positive Electrodes Produced by Electrodeposition Thereof To a plastic cup was added 6.37 g of the PVDF dispersion from Example 3 (1.09 g of solid material, 4 wt. % of the total solids content; 0.05 g ACRYSOL ASE-60, 0.20 wt % of the total solids; 1.04 g PVDF, 3.80 wt. % of the total solids), 1.02 g of ethanol, and 23.00 g of deionized water. This mixture was mixed in a centrifugal mixer at 2,000 RPMs for 5 minutes. Next, 25 g (92 wt. % of the total solids content) of electrochemically active material for a positive electrode ("NMC", $LiNi_{0.3}Co_{0.3}Mn_{0.3}O_2$ commercially available from MTI) was added to the mixture, and the mixture was mixed in centrifugal mixer at 2000 RPMs for 5 minutes. Next, 1.09 g (4 wt. % of the total solids content) of electrically conductive agent ("Super P" carbon black commercially available from Imerys) was added to the mixture, and the mixture was mixed in a centrifugal mixer at 2000 RPMs for 5 minutes. Finally, 1.00 g of Hexyl CELLOSOLVE™ glycol ether from DOW Chemical Co. and 0.30 g of DOWANOL PnB glycol ether from DOW Chemical Co. was added to the mixture, and the mixture was mixed in a centrifugal mixer at 2000 RPMs for 5 minutes. The composition was diluted to 10% total solids by the addition of 214 g of deionized water under constant stir using a magnetic stir bar at 800 RPMs. The pH of the fully formulated electrodepositable coating composition was 9.25. After 30 minutes of stirring, anionic electrodeposition was performed using the same procedure as described in Examples 4-9. Depositions at 10 s, 20 s, and 30 s were measured to determine a mass deposition rate of 3.52 mg/cm$^2$/s according to the procedure described in Examples 4-9.

Comparative Example 11: Preparation of Comparative Electrodepositable Composition without a pH-Dependent Rheology Modifier To a plastic cup was added 9.33 g (3.26 g solids; 4 wt. % of the total solids content of composition) of a dispersion of PVDF and dispersant as prepared in Example 2, 5.136 g of ethanol, and 66.03 g of deionized water. This mixture was mixed in a centrifugal mixer at 2,000 RPMs for 5 minutes. Next, 75 g (92 wt. % of the total solids content of composition) of electrochemically active material ("NMC", $LiNi_{0.3}Co_{0.3}Mn_{0.3}O_2$ commercially available from MTI) was added to the mixture, and the mixture was mixed in centrifugal mixer at 2,000 RPMs for 5 minutes. Next, 3.26 g (4 wt. % of the total solids content of the composition) of electrically conductive agent ("Super P" carbon black commercially available from Imerys) was added to the mixture and mixed in a centrifugal mixer at 2000 RPMs for 5 minutes. Finally, 6.76 g of Hexyl CELLOSOLVE™ glycol ether from DOW Chemical Co. and 2.12 g of DOWANOL™ PnB glycol ether from the DOW Chemical Co. was added to the mixture and mixed in a centrifugal mixer at 2000 RPMs for 5 minutes. The electrodepositable coating composition was diluted to 10% total solids by the addition of deionized water under constant stir using a magnetic stir bar at 800 RPMs. The pH of the comparative electrodepositable coating composition was 10.13. After 30 minutes of stirring, anionic electrodeposition was performed using the same procedure as described in Examples 4-9. Depositions at 10 s, 20 s, and 30 s were measured to determine a mass deposition rate of 0.24 mg/cm$^2$/s according to the procedure described in Examples 4-9. This mass deposition rate under this procedure is not acceptable to produce a continuous coating sufficient to allow the coated substrate to serve as an electrode in an electrical storage device.

Comparative Example 12: Preparation of Comparative Electrodepositable Composition with a Non-pH-Dependent Rheology Modifier To a plastic cup was added 2.56 g (0.11 g solids, 0.4 wt. % of the total solids of the composition) of a dispersion of hydroxyethyl cellulose rheology modifier (HEC QP-300 from DOW Chemical Co.), 2.8 g (0.98 g solid, 3.6 wt. % of the total solids of the composition) of the PVDF dispersion of Example 2, 1.73 g of ethanol, and 22.45 g of deionized water. This mixture was mixed in a centrifugal mixer at 2,000 RPMs for 5 minutes. Next, 25 g (92 wt. % of the total solids content) of electrochemically active material for a positive electrode ("NMC", $LiNi_{0.3}Co_{0.3}Mn_{0.3}O_2$ commercially available from MTI) was added to the mixture, and the mixture was mixed in centrifugal mixer at 2000 RPMs for 5 minutes. Next, 1.09 g (4 wt. % of the total solids content) of electrically conductive agent ("Super P" carbon black commercially available from Imerys) was added to the mixture, and the mixture was mixed in a centrifugal mixer at 2000 RPMs for 5 minutes. Finally, 2.3 g of Hexyl CELLOSOLVE™ glycol ether from DOW Chemical Co. and 0.719 g of DOWANOL™ PnB from DOW Chemical Co. was added to the mixture, and the mixture was mixed in a centrifugal mixer at 2000 RPMs for 5 minutes. The composition was diluted to 10% total solids by the addition of deionized water under constant stir using a magnetic stir bar at 800 RPMs. The pH of the fully formulated electrodepositable coating composition was 9.54. After 30 minutes of stirring, anionic electrodeposition was performed using the same procedure as described in Examples 4-9. Depositions at 10 s, 20 s, and 30 s were measured to determine a mass deposition rate of 0.16 mg/cm$^2$/s according to the procedure described in Examples 4-9. This mass deposition rate is not acceptable to produce a continuous coating sufficient to allow the coated substrate to serve as an electrode in an electrical storage device.

Evaluation of Electrodes Produced by Electrodeposition in Coin Cells

Coin cells were fabricated from the positive electrodes prepared by electrodeposition for a duration of 10 seconds as described above for each example. The coated substrates of Examples 4-10 were baked at 245° C. for 10 minutes, and then substrates were pressed to 35% porosity after baking using a calendar press provided by Innovative Machine Corporation before use as a positive electrode in the coin cell. The positive electrodes were paired with a lithium metal negative electrode. A ceramic coated 20 μm thick Celgard separator was used as the separator. The electrolyte was comprised of 1.2 M $LiPF_6$ in a solvent mixture of ethylene carbonate ("EC") and ethyl methyl carbonate ("EMC") at a 3:7 ratio of EC:EMC. The coin cell was fabricated using 316 stainless steel casings and pairing a 1 cm diameter positive electrode with a 1.5 cm diameter lithium negative electrode and 60 μL of electrolyte solution. Testing of the batteries was performed on an Arbin battery tester using a single formation step at 0.1C followed by three cycles at each rate specified in Table 4 below. Battery cycling was characterized by cycling the batteries at 1C after the rate study was completed.

TABLE 4

| Example | Capacity at 0.1C | Capacity at 0.2C | Capacity at 0.4C | Capacity at 0.8C | Capacity at 1.6C | Capacity at 1C after 20 cycles |
| --- | --- | --- | --- | --- | --- | --- |
| 4 | 164 | 157 | 144 | 138 | 121 | 137 |
| 5 | 128 | 100 | 89 | 73 | 61 | 74 |
| 6 | 122 | 107 | 98 | 89 | 79 | 84 |
| 7 | 165 | 125 | 94 | 0 | 0 | 0 |
| 8 | 158 | 139 | 122 | 96 | 42 | 80 |
| 9 | 137 | 114 | 93 | 63 | 0 | 43 |
| 10 | 148 | 134 | 122 | 91 | 41 | 73 |

These examples demonstrate that the positive electrodes produced by electrodeposition are able to provide acceptable performance when used in a coin cell. In particular, the examples that included the pH-dependent rheology modifier ACRYSOL™ ASE-60 and the dispersant provided good performance.

Evaluation of Adhesion of Electrodes Produced by Electrodeposition and Comparative Electrode Prepared by Drawdown Method Example 13: Preparation of Electrodepositable Coating Composition for Producing a Positive Electrode by Electrodeposition, Preparation of Positive Electrode by Electrodeposition and Evaluation of Adhesion To a plastic cup was added 7.69 g (0.33 g solid, 0.4 wt. % of the total solids of the composition) of a dispersion of an alkali swellable rheology modifier (ACRYSOL™ ASE-60 from DOW Chemical Co.), 8.39 g (2.93 solids, 3.6 wt. % of the total solids of the composition) of the PVDF dispersion of Example 2, 5.136 g of ethanol, and 66.03 g of deionized water. This mixture was mixed in a centrifugal mixer at 2,000 RPMs for 5 minutes. Next, 75 g (92 wt. % of the total solids of the composition) of electrochemically active material for a positive electrode ("NMC", $LiNi_{0.3}Co_{0.3}Mn_{0.3}O_2$ commercially available from MTI) was added to the mixture, and the mixture was mixed in centrifugal mixer at 2000 RPMs for 5 minutes. Next, 3.26 g (4 wt. % of the total solids content) of electrically conductive agent ("Super P" carbon black commercially available from Imerys) was added to the mixture, and the mixture was mixed in a centrifugal mixer at 2000 RPMs for 5 minutes. Finally, 6.768 g of Hexyl CELLOSOLVE™ glycol ether from DOW Chemical Co. and 2.115 g of DOWANOL™ PnB glycol ether from DOW Chemical Co. was added to the mixture, and the mixture was mixed in a centrifugal mixer at 2000 RPMs for 5 minutes. The composition was diluted to 10% total solids by the addition of deionized water under constant stirring using a magnetic stir bar at 800 RPMs. The pH of the fully formulated electrodepositable coating composition was 9.79. After 30 minutes of stirring, anionic electrodeposition was performed. A 5.5 cm by 11 cm carbon-coated aluminum foil immersed 8 cm into the electrodepositable coating composition served as the anode to be coated with a separation of 2.7 cm from a 5.5 cm by 11 cm aluminum foil serving as a counter-electrode, each aluminum foil commercially available from MTI. The electrodepositable coating composition was stirred using a magnetic stirrer throughout the duration of the electrodeposition, and a 30V electrical potential was applied across the electrodes using a direct current rectifier for a duration of 40 seconds. The coated substrate had an electrodeposited film having a loading of 11.2 mg/cm$^2$. The coated substrate was baked at 245° C. for 10 minutes, and then substrate was pressed to 35% porosity after baking using a calendar press provided by Innovative Machine Corporation. The adhesion of the coating to the substrate was measured using the PEEL STRENGTH TEST METHOD, described above. The adhesion testing yielded a peel strength value of 19.0 N/m.

Comparative Example 14: Preparation of Positive Electrode by Drawdown Method and Evaluation of Adhesion To a plastic cup was added 1.602 g (0.068 g solids, 0.4 wt. % of the total solids of the composition) of a dispersion of an alkali swellable rheology modifier (ACRYSOL™ ASE-60 from DOW Chemical Co.), 1.79 g (0.63 g solids, 3.6 wt. % of the total solids of the composition) of the PVDF dispersion of Example 2, 1.02 g of ethanol, and 13.20 g of deionized water. This mixture was mixed in a centrifugal mixer at 2,000 RPMs for 5 minutes. Next, 15 g (92 wt. % of the total solids of the composition) of electrochemically active material for a positive electrode ("NMC", $LiNi_{0.3}Co_{0.3}Mn_{0.3}O_2$ commercially available from MTI) was added to the mixture, and the mixture was mixed in centrifugal mixer at 2000 RPMs for 5 minutes. Next, 0.65 g (4 wt. % of the total solids of the composition) of electrically conductive agent ("Super P" carbon black commercially available from Imerys) was added to the mixture, and the mixture was mixed in a centrifugal mixer at 2000 RPMs for 5 minutes. Finally, 1.35 g of Hexyl CELLOSOLVE™ glycol ether from DOW Chemical Co. and 0.42 g of DOWANOL™ PnB glycol ether from DOW Chemical Co. was added to the mixture, and the mixture was mixed in a centrifugal mixer at 2000 RPMs for 5 minutes. The pH of the fully formulated electrodepositable coating composition was 9.79. Films were cast onto an aluminum foil substrate identical to the substrate used in Example 13 using an AFA-II automatic thick film coater from MTI systems and a drawdown bar with a gap thickness of 150 μm moving at a rate of 30 mm/sec. A film with a loading of 9.2 mg/cm$^2$ and a porosity of 35% was used for evaluating adhesion. The coated substrate was baked at 245° C. for 10 minutes, and then substrate was pressed to 35% porosity after baking using a calendar press provided by Innovative Machine Corporation. The adhesion was measured using the PEEL STRENGTH TEST METHOD, and yielded a peel strength value of 4.3 N/m.

Example 13 and Comparative Example 14 demonstrate that the electrodes produced by electrodeposition had significantly improved adhesion of the deposited film to the underlying substrate compared to similar coating compositions applied by conventional methods, such as a drawdown method.

Preparation of Electrodepositable Coating Compositions for Producing Negative Electrodes and Evaluation Thereof Example 15: Preparation of Electrodepositable Coating Composition for Producing a Negative Electrode and Electrodeposition Thereof To a plastic cup was added 0.09 g (0.40 wt. %, based on total solids) of an alkali swellable rheology modifier dispersion (ACRYSOL ASE-60 from DOW Chemical Co.), 0.80 g (3.60 wt. %, based on total solids) of the dispersion of PVDF and dispersant from Example 2, 1.354 g of ethanol, and 28.09 g of deionized water. This mixture was mixed in a centrifugal mixer at 2,000 RPMs for 5 minutes. Next, 20 g (90 wt. %, based on total solids) of electrochemically active material (artificial graphite powder, available from MTI Corp.) was added to the mixture, and the mixture was mixed in a centrifugal mixer at 2,000 RPMs for 5 minutes. Next, 1.33 g (6.0 wt. %, based on total solids) of electrically conductive agent ("Super P" carbon black commercially available from Imerys) was added to the mixture, and the mixture was mixed in a centrifugal mixer at 2,000 RPMs for 5 minutes. Finally, 0.801 g of Hexyl CELLOSOLVE from DOW Chemical Co. and 0.246 g of DOWANOL PnB from DOW Chemical Co. were added to the mixture, and the mixture was mixed in a centrifugal mixer at 2,000 RPMs for 5 minutes. The electrodepositable coating composition was diluted to 10% total solids by the addition of 173 g of deionized water under constant stirring using a magnetic stir bar at 800 RPMs. After 30 minutes of stirring, anionic electrodeposition was performed using the same procedure as described in Examples 4-9. Depositions at 10 s, 20 s, and 30 s were measured to determine a mass deposition rate of 0.774 mg/cm$^2$/s according to the procedure described in Examples 4-9.

Comparative Example 16: Preparation of Comparative Electrodepositable Coating Composition for Producing a Negative Electrode and Electrodeposition Thereof To a plastic cup was added 0.44 g (2 wt. %, based on total solids) of the dispersion of PVDF and dispersant from Example 2, 1.702 g of ethanol, and 24.53 g of deionized water. This mixture was mixed in a centrifugal mixer at 2,000 RPMs for 5 minutes. Next, 20.02 g (90 wt. %, based on total solids) of electrochemically active material (artificial graphite powder, available from MTI Corp.) was added to the mixture, and the mixture was mixed in a centrifugal mixer at 2,000 RPMs for 5 minutes. Next, 1.78 g (8 wt. %, based on total solids) of electrically conductive agent ("Super P" carbon black commercially available from Imerys) was added to the mixture, and the mixture was mixed in a centrifugal mixer at 2,000 RPMs for 5 minutes. Finally, 2.257 g of Hexyl CELLOSOLVE from DOW Chemical Co. and 0.704 g of DOWANOL PnB from DOW Chemical Co. were added to the mixture, and the mixture was mixed in a centrifugal mixer at 2,000 RPMs for 5 minutes. The electrodepositable coating composition was diluted to 10% total solids by the addition of 173 g of deionized water under constant stirring using a magnetic stir bar at 800 RPMs. After 30 minutes of stirring, anionic electrodeposition was performed using the same procedure as described in Examples 4-9. Depositions at 10 s, 20 s, and 30 s were measured to determine a mass deposition rate of 0.19 mg/cm$^2$/s according to the procedure described in Examples 4-9. This mass deposition rate is not acceptable to produce a continuous coating sufficient to allow the coated substrate to serve as an electrode in an electrical storage device.

Preparation of VOC-Free Electrodepositable Coating Compositions for Producing Positive Electrodes and Evaluation Thereof Example 17: Preparation of a VOC-Free Electrodepositable Coating Composition To a plastic cup was added 1.83 g (0.54 g solids, 2.0 wt. % of the total solids of the composition) of a dispersion of an alkali swellable rheology modifier (ACRYSOL™ HASE TT-615 from DOW Chemical Co.), 1.67 g (0.54 g solids, 2.0 wt. % of the total solids of the composition) of the PVDF dispersion of Example 2, and 23.0 g of deionized water. This mixture was mixed in a centrifugal mixer at 2,000 RPMs for 5 minutes. Next, 25 g (92 wt. % of the total solids of the composition) of electrochemically active material for a positive electrode ("NMC", LiNi$_{0.3}$Co$_{0.3}$Mn$_{0.3}$O$_2$ commercially available from MTI) was added to the mixture, and the mixture was mixed in centrifugal mixer at 2000 RPMs for 5 minutes. Next, 1.09 g (4 wt. % of the total solids content) of electrically conductive agent ("Super P" carbon black commercially available from Imerys) was added to the mixture, and the mixture was mixed in a centrifugal mixer at 2000 RPMs for 5 minutes. The composition was diluted to 10% total solids by the addition of 219 g of deionized water under constant stirring using a magnetic stir bar at 800 RPMs. The pH of the fully formulated electrodepositable coating composition was 8.57, and the electrodepositable coating composition was VOC-free, i.e., had 0 g of VOC. After 30 minutes of stirring, anionic electrodeposition was performed using the same procedure as described in Examples 4-9. Depositions at 10 s, 20 s, and 30 s were measured to determine a mass deposition rate of 1.35 mg/cm$^2$/s according to the procedure described in Examples 4-9.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:
1. An electrodepositable coating composition comprising:
 (a) a fluoropolymer;
 (b) an electrochemically active material and/or electrically conductive agent;
 (c) a pH-dependent rheology modifier; and
 (d) an aqueous medium comprising water;
 wherein water is present in an amount of at least 45% by weight, based on the total weight of the electrodepositable coating composition,
 wherein the electrodepositable coating composition has a solids content of no more than 30% by weight, based on the total weight of the electrodepositable coating composition.

2. The electrodepositable coating composition of claim 1, wherein the fluoropolymer comprises a (co)polymer comprising the residue of vinylidene fluoride.

3. The electrodepositable coating composition of claim 2, wherein the fluoropolymer comprises a (co)polymer comprising the residue of tetrafluoroethylene.

4. The electrodepositable coating composition of claim 1, wherein the electrochemically active material comprises $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, or a combination thereof.

5. The electrodepositable coating composition of claim 1, wherein the electrochemically active material comprises sulfur, $LiO_2$, $FeF_2$ and $FeF_3$, Si, aluminum, tin, SnCo, $Fe_3O_4$, or combinations thereof.

6. The electrodepositable coating composition of claim 1, wherein the electrochemically active material comprises graphite, lithium titanate, lithium vanadium phosphate, silicon, silicon compounds, tin, tin compounds, sulfur, sulfur compounds, lithium metal, graphene, or a combination thereof.

7. The electrodepositable coating composition of claim 1, wherein the pH-dependent rheology modifier comprises an alkali-swellable rheology modifier.

8. The electrodepositable coating composition of claim 7, wherein a composition of water and the alkali-swellable rheology modifier at 4.25% by weight of the total composition of water and the alkali-swellable rheology modifier has an increase in viscosity of at least 500 cps over an increase in pH value of 1 pH unit, as measured using a Brookfield viscometer using a #4 spindle and operated at 20 RPMs.

9. The electrodepositable coating composition of claim 1, wherein the pH-dependent rheology modifier comprises an acid-swellable rheology modifier.

10. The electrodepositable coating composition of claim 1, further comprising a dispersant.

11. The electrodepositable coating composition of claim 10, wherein the dispersant comprises a (meth)acrylic polymer dispersant.

12. The electrodepositable coating composition of claim 10, further comprising a crosslinking agent.

13. The electrodepositable coating composition of claim 11, wherein the electrically conductive agent comprises conductive carbon black, carbon nanotubes, graphene, graphite, carbon fibers, fullerenes, and combinations thereof.

14. The electrodepositable coating composition of claim 1, wherein the electrodepositable coating composition comprises:
    (a) 0.1% to 10% by weight of the fluoropolymer;
    (b) 45% to 99% by weight of the electrochemically active material;
    (c) 0.1% to 10% by weight of the pH-dependent rheology modifier; and
    (d) optionally 0.5% to 20% by weight of the electrically conductive agent; the % by weight based on the total solids weight of the electrodepositable composition.

15. The electrodepositable coating composition of claim 1, wherein the VOC of the electrodepositable coating composition is no more than 300 g/L.

16. The electrodepositable coating composition of claim 1, wherein the electrodepositable coating composition is substantially free of fugitive adhesion promoter.

17. The electrodepositable coating composition of claim 1, wherein a coating produced by electrodepositing the electrodepositable coating composition of claim 1 to a substrate has a 90° peel strength at least 20% greater than a comparative coating composition that does not include the pH-dependent rheology modifier, the 90° peel strength measured according to PEEL STRENGTH TEST METHOD.

18. The electrodepositable coating composition of claim 1, wherein a coating produced by electrodepositing the electrodepositable coating composition of claim 1 to a substrate has a 90° peel strength of at least 5 N/m, as measured according to PEEL STRENGTH TEST METHOD.

19. A method of coating a substrate, the method comprising:
    electrocoating the electrodepositable coating composition of claim 1 onto a substrate.

20. The method of claim 19, wherein the method has a mass deposition rate of the electrodepositable coating composition of at least 0.5 $mg/cm^2/s$.

* * * * *